(12) United States Patent
Tokui

(10) Patent No.: US 6,728,733 B2
(45) Date of Patent: Apr. 27, 2004

(54) SYSTEM, METHOD, AND PROGRAM PRODUCT FOR ADMINISTRATING DOCUMENT FILE IN COMPUTERIZED NETWORK SYSTEM

(75) Inventor: Kouichi Tokui, Komatsu (JP)

(73) Assignee: Komatsu Wall System Development Co., Ltd., Komatsu (JP)

( * ) Notice: Subject to any disclaimer, the term of this patent is extended or adjusted under 35 U.S.C. 154(b) by 328 days.

(21) Appl. No.: 09/795,308

(22) Filed: Mar. 1, 2001

(65) Prior Publication Data

US 2001/0029510 A1 Oct. 11, 2001

(30) Foreign Application Priority Data

Mar. 29, 2000 (JP) .......................................... 2000-090549
Nov. 10, 2000 (JP) .......................................... 2000-344526

(51) Int. Cl.[7] .......................... G06F 12/00; G06F 17/30; G06F 7/00
(52) U.S. Cl. .......................... 707/200; 707/10; 707/201
(58) Field of Search .......................... 707/10, 200, 201

(56) References Cited

U.S. PATENT DOCUMENTS

| 5,493,678 | A | * | 2/1996 | Arcuri et al. ............... 395/600 |
| 5,553,216 | A | * | 9/1996 | Yoshioka et al. ............ 395/145 |
| 5,649,200 | A | * | 7/1997 | Leblang et al. ............. 395/703 |
| 5,963,925 | A | * | 10/1999 | Kolling et al. ................ 705/40 |
| 6,230,173 | B1 | * | 5/2001 | Ferrel et al. ................ 707/513 |
| 6,341,291 | B1 | * | 1/2002 | Bentley et al. .............. 707/203 |

FOREIGN PATENT DOCUMENTS

| JP | 8-305724 A | 11/1996 |
| JP | 11-003357 A | 1/1999 |

* cited by examiner

Primary Examiner—Wayne Amsbury
Assistant Examiner—Cindy Nguyen
(74) Attorney, Agent, or Firm—Smith Patent Office

(57) ABSTRACT

A document file administrative system includes a plurality of client computers each accessible by a user, a server computer containing document files each having an attribute relating to a node constituting a tree for hierarchically classifying the document files in a project, a network connecting the plurality of client computers with the server computer to thereby enable a user to search out a document file by a given attribute. A user is allowed to duplicate a selected document file by user's request. The server computer has a closed database for containing data which only registered users are authorized to access to, and an opened database for containing data which any user is authorized to access.

22 Claims, 22 Drawing Sheets

SYSTEM, METHOD, AND PROGRAM PRODUCT FOR ADMINISTRATING DOCUMENT FILE IN COMPUTERIZED NETWORK SYSTEM

BACKGROUND OF THE INVENTION

1. Field of the Invention

This invention relates to a system, method and program product for efficiently administering, sharing, and re-using a series of document files which are necessary to proceed with business in an organization such as company. Such documents include business sale records, estimates, technical documents, drawings created by Computer-Aided-Design (CAD), documents recorded with expert knowledge or ideas, and other various business reports.

2. Description of the Related Art

Japanese Unexamined Patent Publication No. 8-305724 discloses a document file administrative system capable of administering documents concerning expertized knowledge or ideas directed to design business for re-use and sharing. Specifically, in the above publication, attributes, keywords, summaries of individual documents which have been created from time to time in the course of work are registered in advance as keys for retrieval. Each user who individually use the document file administrative system systematically administrates these keys as a group of individual views, and correlates the group of individual views with a group of common views that are referable among the users in common. Each user can retrieve an arbitrary document data through the group of common views.

In the aforementioned conventional system, each time the user creates a new document, he or she is required to register and systematically administer the attributes, keywords, and summaries as retrieval keys based on the assumption that the document will be used in the future. Creating, registering, and administrating retrieval keys require a highly-skilled technique and a quantitative amount of labor. Further, inputting inappropriate content for the key fails to properly retrieve necessary document data. Therefore, training of the users so that they can properly create, register, and administer the keys is required, which, however, is not easy to practice.

SUMMARY OF THE INVENTION

It is an object of the invention to provide a document file administrative system, method and program product which are free from the problems residing in the prior art.

According to an aspect of the invention, a computer-based document file administrative system comprises: a tree edition component for allowing a user to create and edit a tree representing a project on a display, the tree having one or more nodes; a document file edition component for allowing a user to create and edit a document file, and to associate the document file with a node of the tree by an attribute relating to the node, and to store the associated document file in a memory; and a search component for searching out a document file from document files stored in the memory based on a given attribute, and represents the presence of searched out document file in connection with the corresponding node.

According to another aspect of the invention, a document file administrative system comprises: a plurality of client computers each accessible by a user; a server computer containing document files each having an attribute relating to a node constituting a tree for hierarchically classifying the document files in a project; a network connecting the plurality of client computers with the server computer to thereby enable a user to search out a document file by a given attribute.

According to still another aspect of the invention, a method is usable in a networked computer system including a server computer and a plurality of client computers accessible by users to effect a document file administration. The method comprises the steps of: preparing and storing a database containing a plurality of document files in the server computer, the plurality of document files each being attached with an attribute relating to a node constituting a tree for hierarchically classifying document files in a project; searching out a document file by a given attribute; providing a user with the presence of searched out document file in connection with the corresponding node.

According to further aspect of the invention, a program product is executable in a networked computer system including a server computer and a plurality of client computers accessible by users to effect a document file administration. The program product comprises the functions of: preparing and storing a database containing a plurality of document files in the server computer, the plurality of document files each being attached with an attribute relating to a node constituting a tree for hierarchically classifying document files in a project; searching out a document file by a given attribute; providing a user with the presence of searched out document file in connection with the corresponding node.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
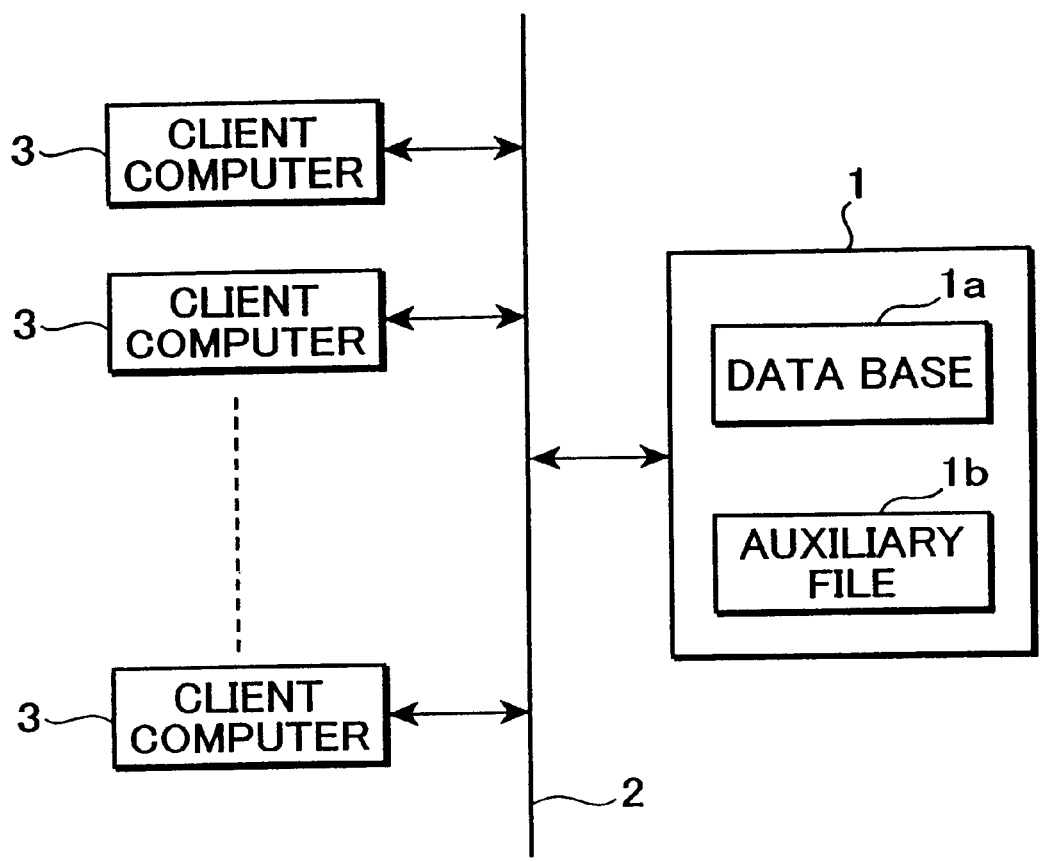
FIG. 1 is a diagram schematically showing a whole construction of a document file administrative system according to an embodiment of the invention.

A document file administrative system according to an embodiment of the invention is, as shown in FIG. 1, operated in a computer network system in which a server computer 1 and a plurality of client computers 3 (terminal computers used by individuals or clients) are interactively connected via a network 2. The server computer 1 is equipped with a database 1a and an auxiliary file 1b.

Figure 2:
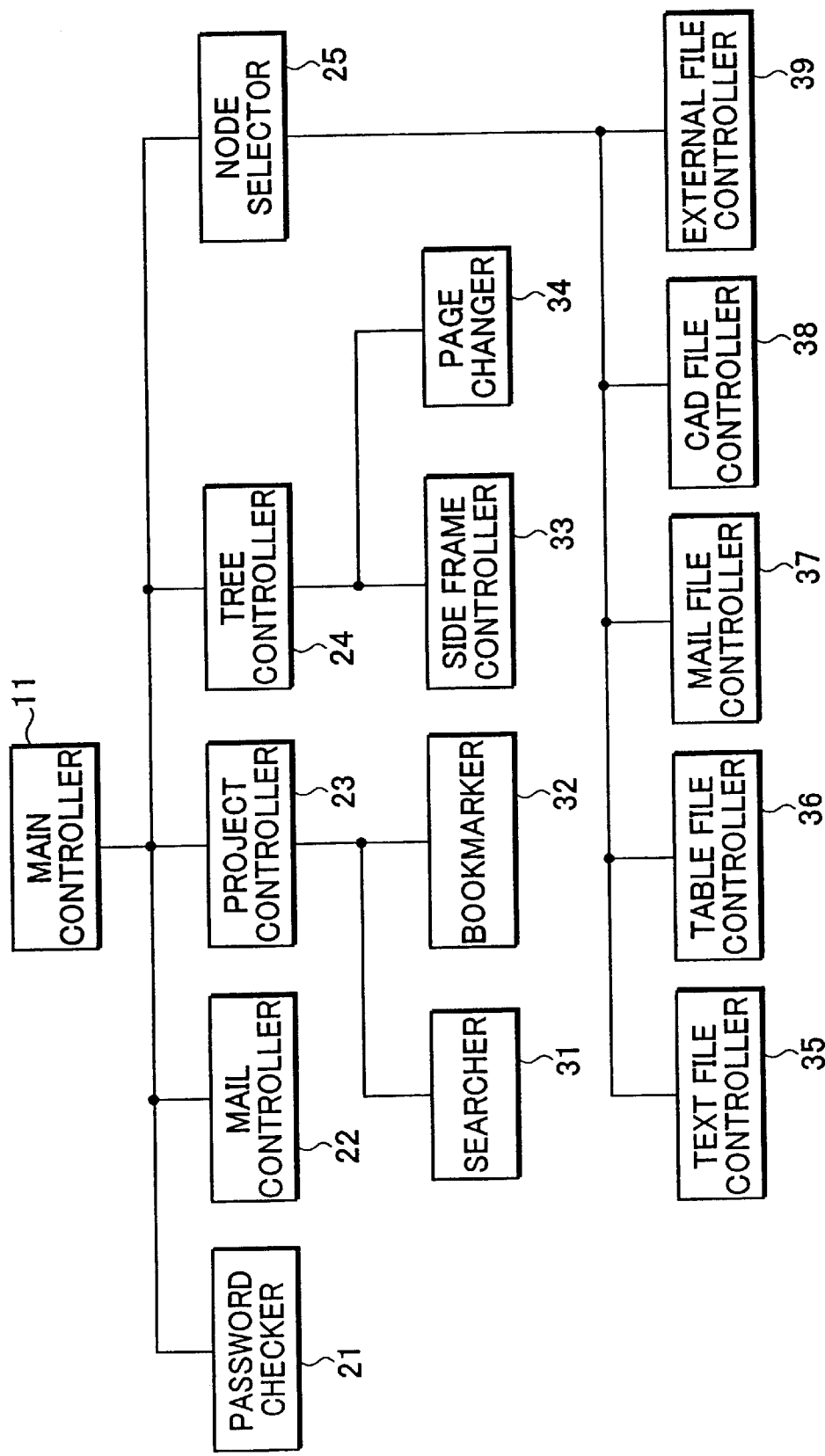
FIG. 2 is a block diagram showing a construction of main parts of the document file administrative system.

FIG. 2 shows an operational relationship between programmed components for implementing or performing a document file administration. According to the performance and capacity of the server computer 1 and the client computers 3, it is determined what programmed components are installed in the server computer 1 or each of the client computers 3. If the server computer 1 has higher capacity and performance, most of the programmed components may be installed in the server computer 1 except for programmed components necessary for the client computer 3. On the other hand, if the server computer 1 has lower capacity and performance and each client computer has considerably high capacity and performance, a relatively greater number of programmed components may be installed in each client computer 3. Also, necessary programmed components are downloaded from the server computer 1 by a user by way of the network 2 and started up on each client computer 3 when needs arises to do. Further, the server computer 1 and each client computer 3 are installed with programmed components for ensuring network signal communications with each other.

The programmed components include a main controller 11, a password checker 21, a mail controller 22, a project controller 23, a tree controller 24, and a node selector 25 all of which are controlled by the main controller 11. A searcher 31 and a bookmarker 32 are controlled by the project controller 23. A side frame controller 33 and a page changer 34 are controlled by the tree controller 24. A text file controller 35, a table file controller 36, a mail file controller 37, a Computer-Aided-Design (CAD) file controller 38, and an external file controller 39 are controlled by the node selector 25.

A client computer 3 is controlled to display a screen image in the form of the so-called multi-windows within a browser on a display screen of the client computer 3. The main controller 11 controls the password checker 21, the mail controller 22, the project controller 23, the tree controller 24, and the node selector 25 to create and display a screen image which enables the user to implement the function inherent to these subordinate controllers.

The document file administrative system having the above structure is activated as follows. The client computers 3 are individually operated by users. Each user interactively connects his/her computer 3 to the server computer 1 through the network 2 or the internet to download the program shown in FIG. 2. The user starts up the main controller 11 in his/her computer 3.

The start-up operation is described with reference to a flowchart showing a system start-up routine shown in FIG. 3. When the start-up routine is started, the main controller 11 controls the password checker 21 to display a query screen image of demanding the user of a password to start up the system. When the user enters a user ID number and a password, the password checker 21 implements referral operation in Step (11) in FIG. 3. The password is pre-registered in the database 1a of the server computer 1 in correspondence to the user ID number depending on the business-wise authority level of the user. The password checker 21 retrieves password data from the database 1a by reference to the entered user ID number. After confirming matching of the pre-registered password with the entered password, the password checker 21 informs the main controller 11 of the allowed authority level.

The main controller 11 controls the project controller 23 to display a list of projects on the display screen of the client computer 3 in Step (12). When the user selects a specific project from the list of projects in Step (13), the project controller 23 notifies the main controller 11 of the number corresponding to the selected project. The main controller 11 controls the tree controller 24 to retrieve attribute data of all the nodes carrying the project number from the database 1a by referring to the project number which has been notified from the main controller 11.

Upon confirming that the tree controller 24 has obtained attribute data of all the nodes having the selected project number from the database 1a, the tree controller 24 is executed to display an image of a tree concerning the project on the display screen of the client computer 3 in correspondence with the attribute data of the nodes in Step (14).

The attribute data of the node includes identification (ID) number of the node, title of the node, ID number of a parent node (an upper node to which the target node is to be connected), number of the project to which the target node belongs, page number of screen image on which the target node is displayed, and coordinate data representing the displayed position of the node on the display screen.

The respective ID numbers of the nodes are independently allocated in the information administrative system. The coordinate of the displayed position of the target node is determined as follows. In the case where a parent node exists with respect to the target node, a position relative to the coordinate representing the displayed position of the parent node is set as a coordinate for the target node. On the other hand, in the case where there exists no parent node for the target node, a position relative to the absolute coordinate on the display screen is set as a coordinate for the target node.

Figure 3:
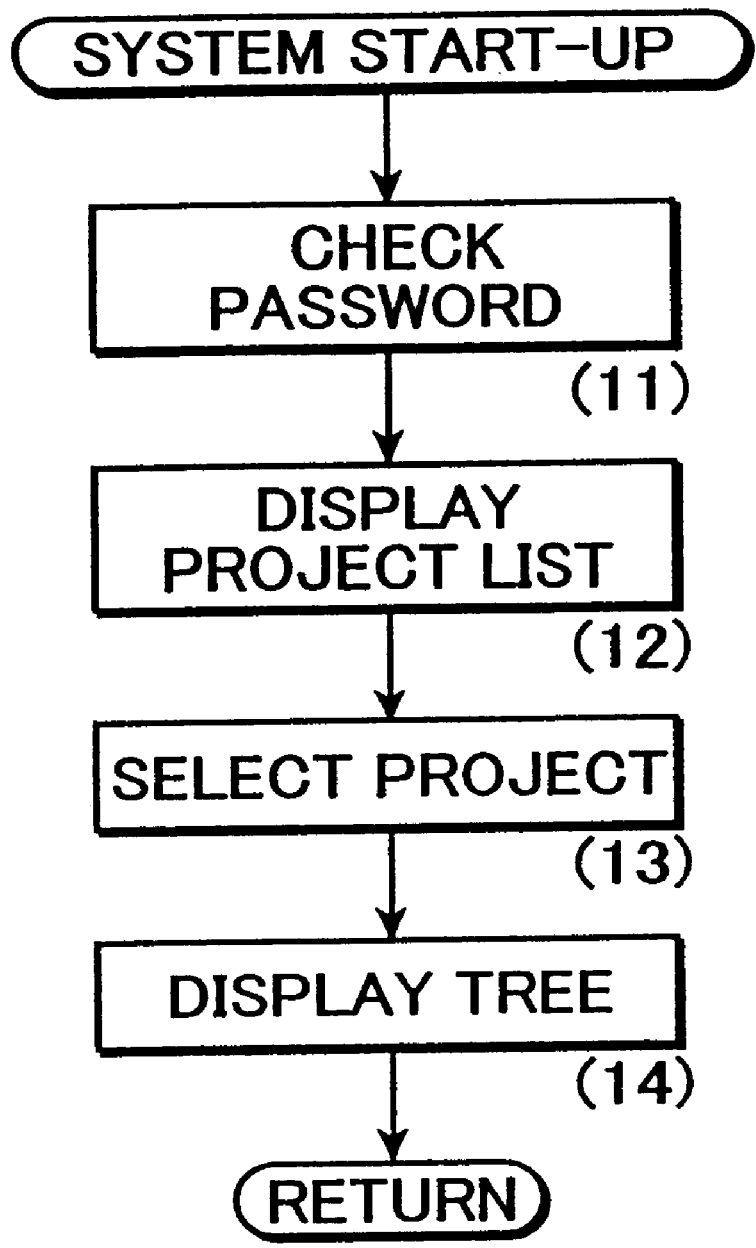
FIG. 3 is a flowchart showing a system start-up routine of the document file administrative system.

In Step (13) of FIG. 3, the project may be selected through data retrieval by designating a specific attribute data of the project such as registration date when the project has been registered, the name of clientele with which the project has been contracted, the title of the project, and the name of a person in charge of the project, etc. In any case, the project controller 23 notifies the main controller 11 of the project number each time a project has been selected, and the main controller 11 controls the tree controller 24 to display an image of the tree representing the project on the display screen of the client computer 3. A plurality of tree images are simultaneously displayed in the format of multi-windows by cooperative operation of the main controller 11, the project controller 23, and the tree controller 24 so that the user can designate and open any window displayed on the display screen.

When an image of the target tree is displayed as mentioned above, the user can perform various creating and editing operations with respect to the tree by manipulating an input device such as a mouse and a keyboard depending on the allowed authority level of the user. For example, the user can delete an already existing node in the tree, alter the displayed position of the node, and the title of the node, alter the parent node to which the target node is connected, add a new node, and connect the newly added node to an arbitrary one of the existing nodes. According to the document file administrative system, the user is enabled to create an arbitrary tree image on the display screen of the client computer 3 according to needs of the user via the tree controller 24.

When the tree image is displayed, the tree controller 24 is executed to store attribute data of the nodes of the tree in a temporary memory provided in the client computer 3. Also, the tree controller 24 is executed to update contents in a temporary memory and transmit the updated data to the database 1a in the server computer 1 when the node or attribute data within the tree is altered.

Figure 4:
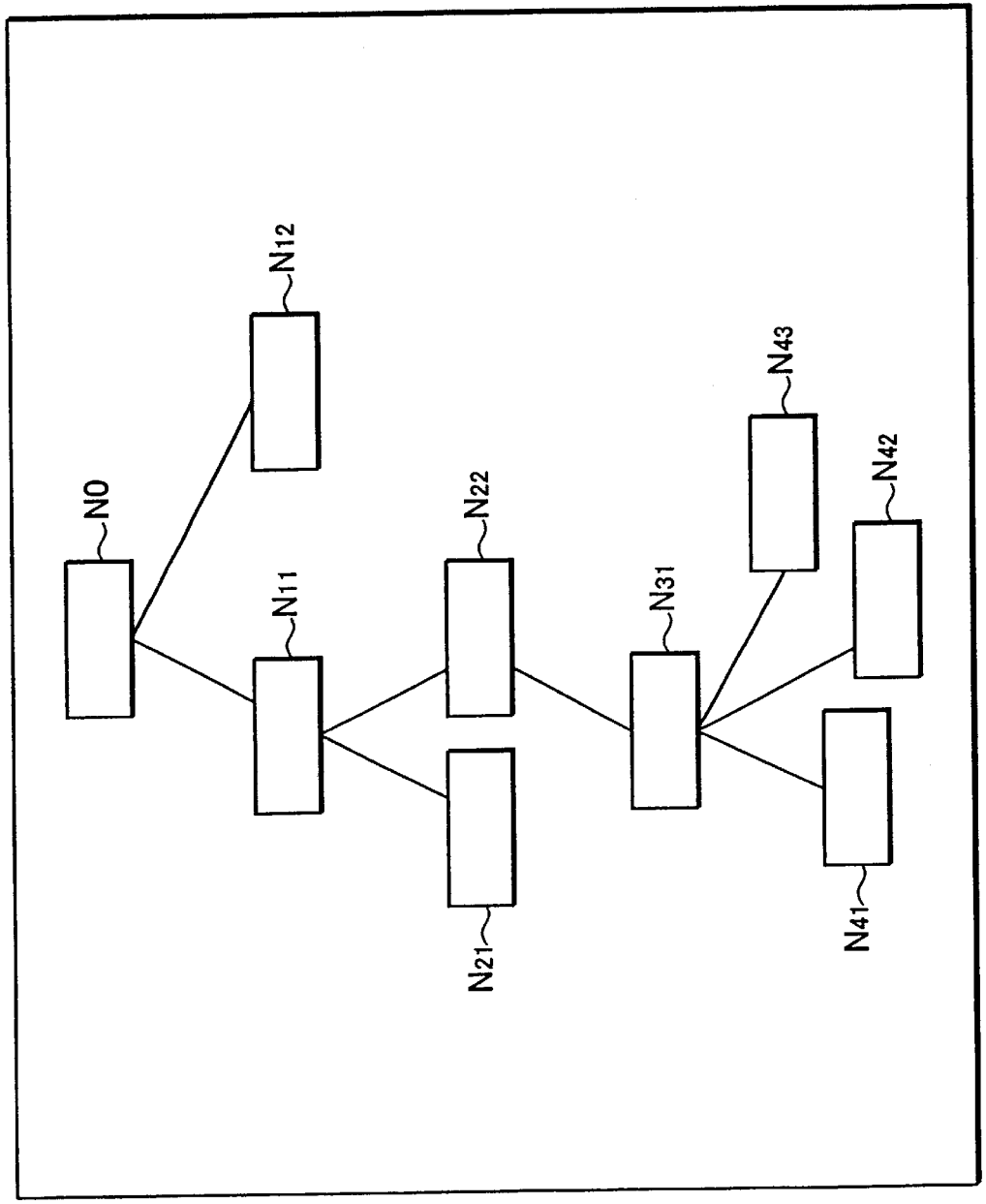
FIG. 4 is a diagram showing a tree image to be displayed on a screen of a client computer.

FIG. 4 shows an exemplary conceptual image of a tree displayed on the screen of the client computer 3. As shown in FIG. 4, the tree includes a root node NO which does not have a parent node, and other lower nodes Nij (i=1, 2, . . . , j=1, 2, . . . ) which are directly or indirectly connected to the root node NO. In FIG. 4, titles are given with respect to the respective nodes including the root node.

A new project creation routine is described with reference to FIG. 5. When a user demands a client computer 3 to create a new project, the main controller 11 controls the project controller 23 to display a query screen image. The query screen image is such that the user is asked to input attribute data of a project such as the name of the project, the registration date (year/month/date), and the name of clientele.

Figure 5:
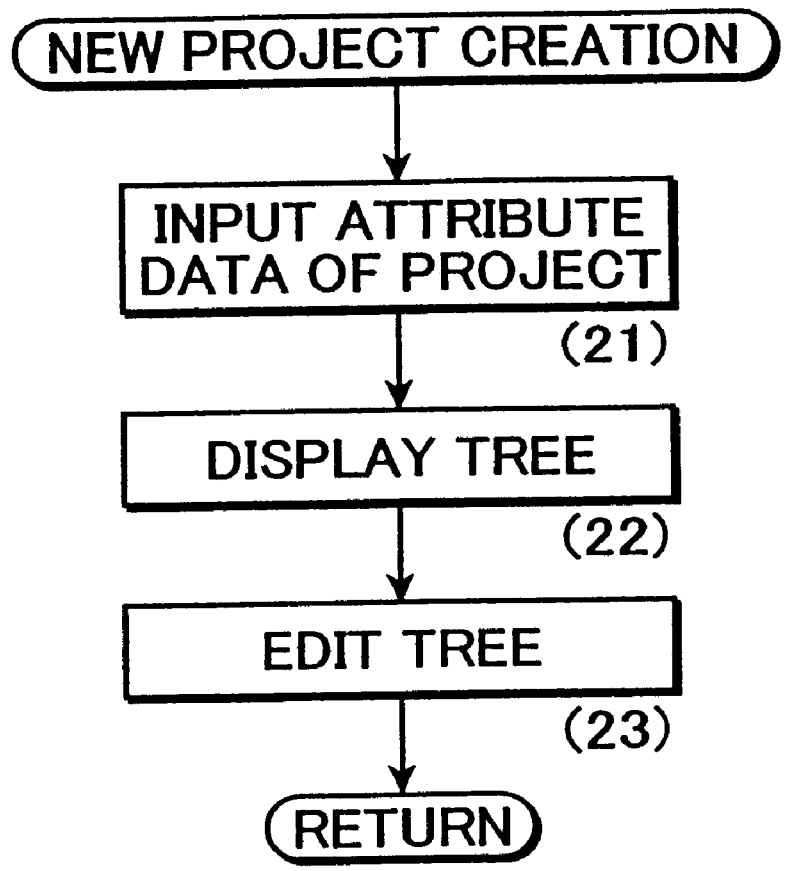
FIG. 5 is a flowchart showing a new project creation routine of the document file administrative system.

When the user enters the attribute data in Step (21) in FIG. 5, the project controller 23 issues a number for the new project and stores the new project number together with attribute data in the database 1a. Thereupon, the main controller 11 activates the tree controller 24 as follows. The tree controller 24 confirms that the project is a new project by verifying that a node having a project number notified from the main controller 11 does not exist in the database 1a. The tree controller 24 is automatically executed to create a root node for the new project, store the root node in the database 1a, and display a tree image solely provided with the root node on the display screen in Step (22). The user can create a new tree representing the new project on the display screen by performing various editing operations as mentioned above with respect to the new tree in Step (23).

The subordinate parts of the main controller 11, namely, the password checker 21, the mail controller 22, the project controller 23, the tree controller 25, and the node selector 25 implement the aforementioned predetermined functions respectively by interchanging necessary data between one another via the main controller 11. It should be noted that description of the operation of the main controller 11 in association with the operation of the subordinate parts is omitted to simplify the description of the structure of the document file administrative system.

Figure 6:
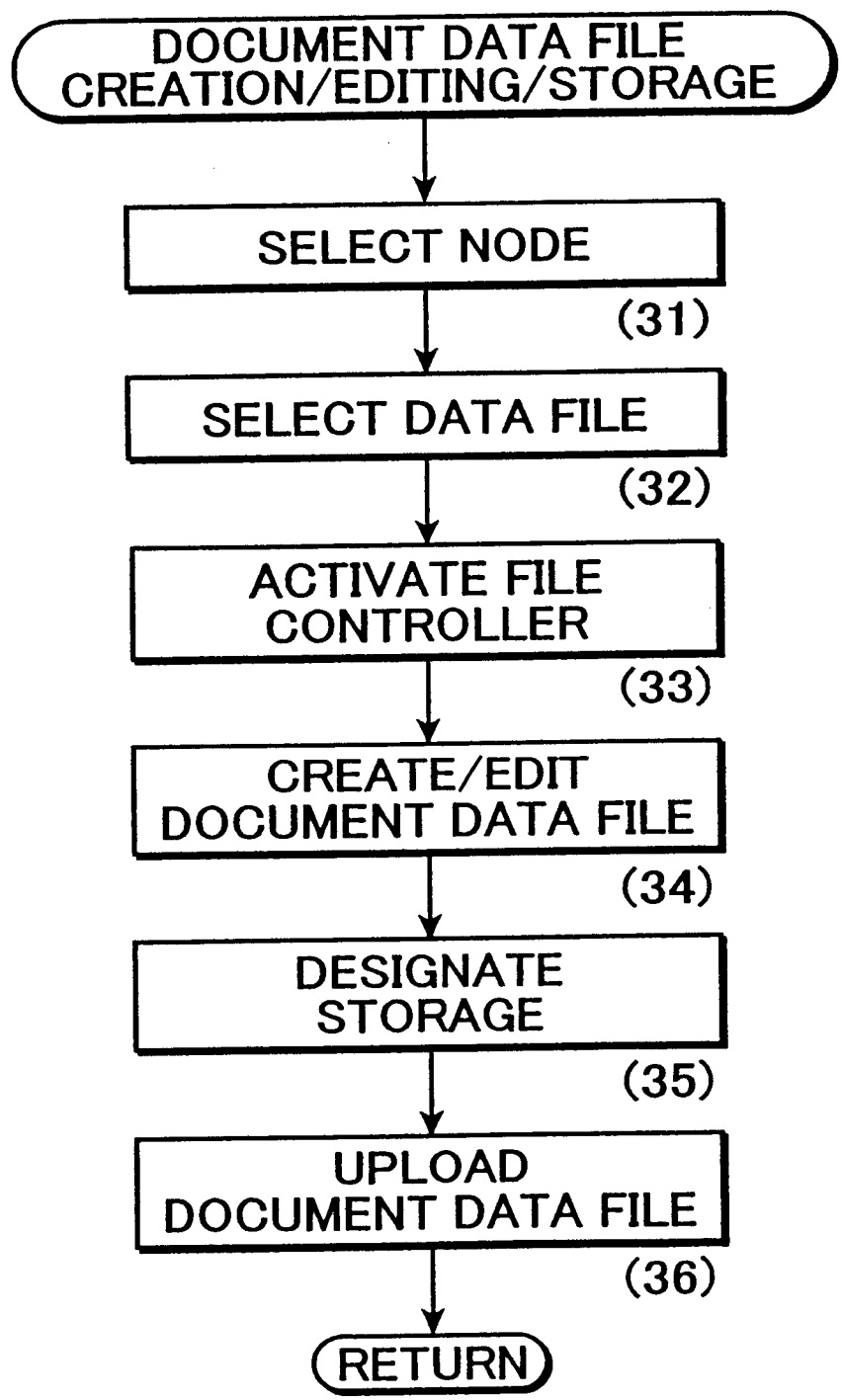
FIG. 6 is a flowchart showing a document file creation/editing/storage routine of the document file administrative system.

A user is enabled to create and edit a document in association with a node of a tree image displayed on the screen. The user is enabled to store data of a document that has been created on the client computer 3 as a document file in the server computer 1. More specifically, when the user selects a selected node of the tree image displayed on the screen in Step (31) of FIG. 6, the tree controller 24 notifies the main controller 11 of the ID number of the selected node. The main controller 11 controls the node selector 25 to display a query screen image to allow the user to select an arbitrary one among data files including data file for statements in the form of text data, data file for table including table computation function and having text data, data file for mail including mailed contents and text data, data file for external data created in accordance with an external program other than the system and having a message in the form of text data, and data file for CAD data created in accordance with a CAD program and having a message in the form of text data. The text data is coded data, and includes coded image data as well as coded letter data.

In the case where a statement data file is selected in Step (32), the node selector 25 activates the text file controller 35 to display a screen image for allowing the user to create and edit a statement in Step (33). Upon completion of creating and editing a statement in Step (34) and designation of storage of the created and edited statement in Step (35), the text file controller 35 is executed to attach the ID number of the node that has been selected in Step (31) to the statement data file, and stores the statement data file along with the ID number in the database 1a in the form of text data, that is, uploading of the statement data file to the server computer 1, in Step (36). In other words, the user can store in the database 1a the created or edited statement data file on the client computer 3 by the way of the node selector 25 and the text file controller 35 in association with the node of the tree image displayed on the screen. A new statement is created and edited in Step (34). In Step (34), alternatively, an already edited statement data is transferred and pasted on the screen for editing. In this way, a created or edited statement data file is stored by the use of the node selector 25 and the text file controller 35.

In the case where the user selects a table data file in Step (32), the node selector 25 activates the table file controller 36 in Step (33). The table file controller 36 is executed to display a screen image for allowing the user to create a document having a table computation function. When the user completes creation of the document in Step (34), and designates storage of the document in Step (35), the table file controller 36 is executed to attach the ID number of the node to the table data file, and store the table data file in association with the node as text data in the database 1a, that is, uploading of the table data file to the server computer 1, Step (36). In this way, a created or edited table computable data file is stored by the use of the node selector 25 and the table file controller 36.

Next, document data file retrieval is described with reference to FIG. 7. The statement data files and table data files which have been stored in the form of text data in the database 1a are entirely searched and retrieved. Specifically, when the user gives a retrieval instruction by the way of the project controller 23, the searcher 31 is executed to display an on-screen image of demanding a search term input. When the user inputs a search term on the screen in Step (41) in FIG. 7, the searcher 31 is executed to start retrieving a document data file from the database 1a by reference to the inputted search term, and obtain the ID number of the node attached to the hit or searched out document data file in Step (42), namely, the node to which the searched document data file belongs. It should be appreciated that the search term includes the title of document data file, the title of a node to which a document data file belongs as well as the entire text of the statement and table data files. The searcher 31 notifies the tree controller 24 of the ID number of the searched node and the number of the project to which the searched node belongs, and suspends its operation.

Upon obtaining the attribute data of all the nodes belonging to the project from the database 1a based on the project number, the tree controller 24 is executed to display a tree image of the project on the screen in Step (43). In Step (43), the user is notified of the presence of the document file by, for example, inverting the color of the node to which the hit document data file belongs. In this way, the document file administrative system accomplishes the document data file retrieval of searching out a desired document data file from the database 1a by way of the node displayed on the screen through cooperative operation of the project controller 23, the searcher 31, and the tree controller 24.

When the user selects the color-inverted node in Step (44), the node selector 25 is activated to allow the text file controller 35 (or the table file controller 36) to download the hit document data file so as to display the document on the screen in Step (45). The user can view the downloaded document data file and re-use the document data file by relating the document data file to a node of other project after editing the document data file according to the procedure shown in FIG. 6.

Figure 7:
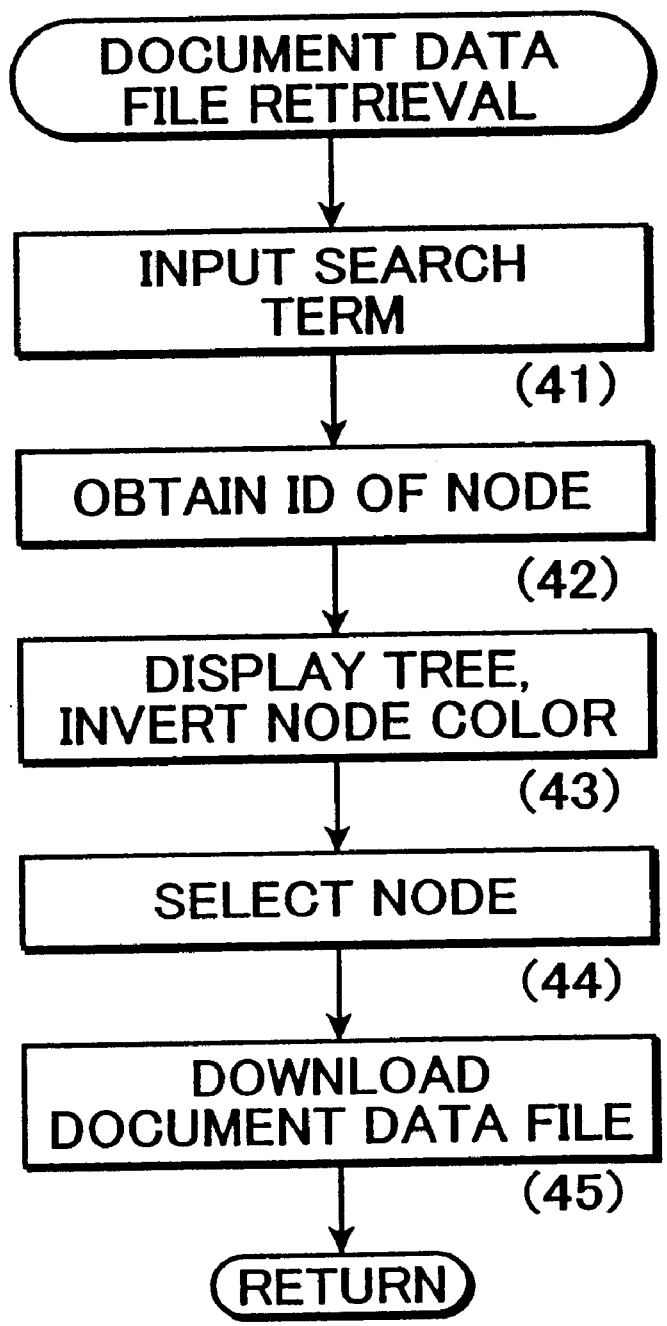
FIG. 7 is a flowchart showing a document file retrieval routine of the document file administrative system.
Figure 8:
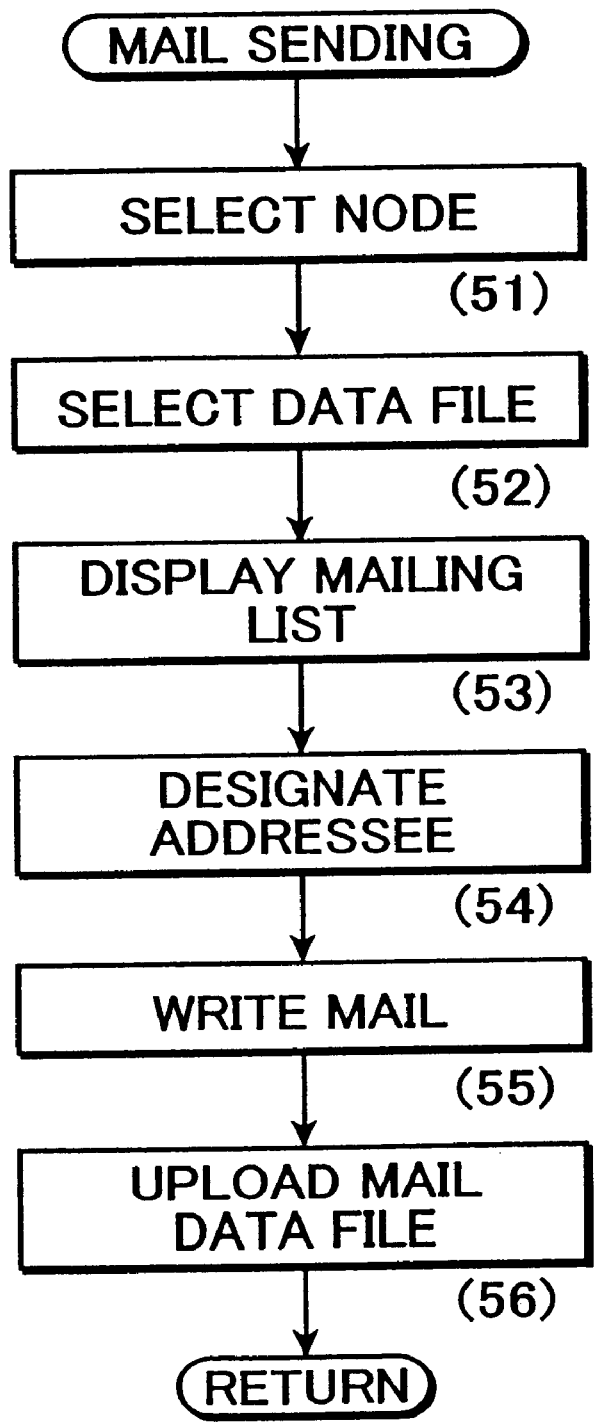
FIG. 8 is a flowchart showing a mail sending routine of the document file administrative system.

In the case where a plurality of node ID numbers have been retrieved, i.e., a plurality of projects have been identified as a result of search by the searcher 31 in Step (42) in FIG. 7, the searcher 31 notifies the tree controller 24 of all the project numbers that have been retrieved as a result of search. In this case, the tree controller 24 is executed to display a plurality of tree images each representing a project in a multi-windows format so that the user can selectively open any one of the multi-windows.

In the case where a plurality of document data files which belong to the same node have been retrieved, a list of all the document data files which belong to the node is displayed so that the user can select one of the document data files after selecting a corresponding node in Step (44). When the user selects one of the document data files from the list displayed on the screen, the selected document data file is downloaded in Step (45).

The user can send an electronic mail to another user(s) in charge of the same project by attaching the mail with a node of a tree representing the project. Specifically, when the user selects one of the nodes of the tree image displayed on the screen in Step (51), the tree controller 24 notifies the main controller 11 of the ID number of the selected node. The main controller 11 controls the node selector 25 to display a query screen image to allow the user to select the kind of document data file. In this case, the mail data file is selected in Step (52). The node selector 25 is executed to retrieve a mailing list stored in the database 1a based on the user ID notified from the password checker 21 and the project number notified from the tree controller 24, and the retrieved mailing list is displayed on the screen in Step (53). The mailing list is pre-registered in correspondence with the user ID number and the project number in the database 1a.

When the user designates an addressee by selecting part or all of the addressees from the mailing list in Step (54), the node selector 25 activates the mail file controller 37 to display an on-screen image for allowing the user to create and edit a mail. When the user completes writing a mail in Step (55), and gives a mail sending command, the mail file controller 37 is executed to attach a mail addressee and the ID number of the node that has been selected in Step (51) to the created mail, and store or upload the mail data file in the database 1a in the form of text data in Step (56). In this way, the document file administrative system enables the user to implement the mail data file storage by cooperative operation of the node selector 25 and the mail file controller 37.

Figure 9:
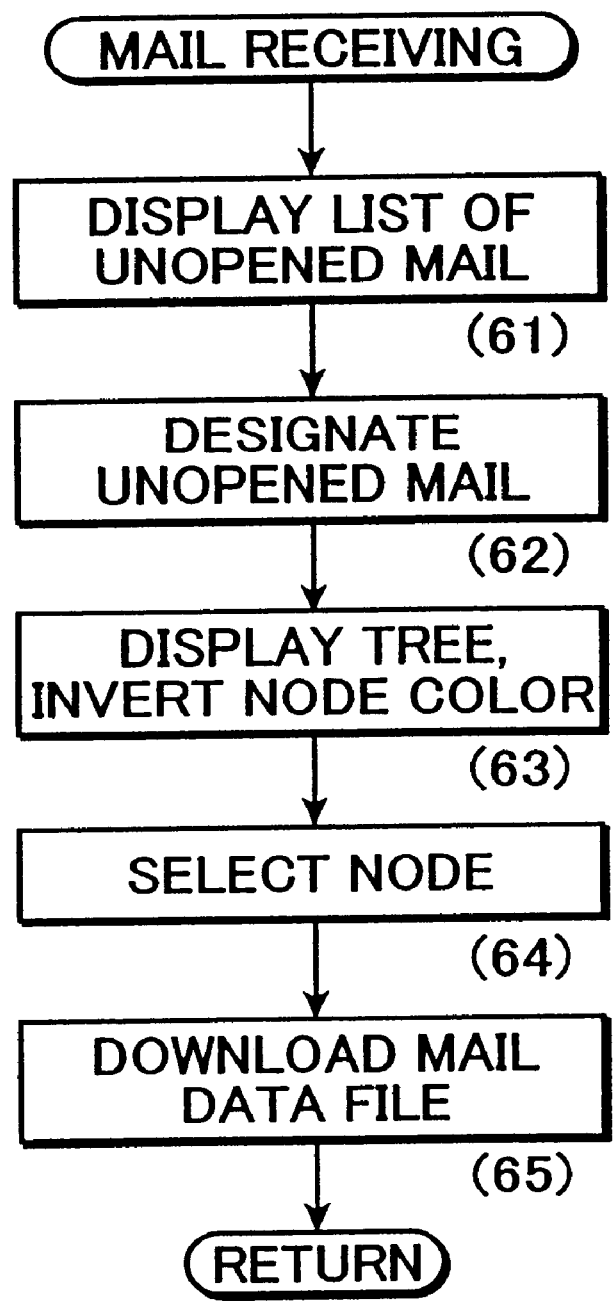
FIG. 9 is a flowchart showing a mail receiving routine of the document file administrative system.

When the user receives a mail or mails from other user(s), a mail receiving routine shown in FIG. 9 is implemented. Specifically, when the user gives a command of listing unopened mail(s) via the project controller 23 or the tree controller 24, the mail controller 22 is activated to retrieve a mail data file from the database 1a based on the inputted user ID number, and display a list of unopened mail(s) carrying the name of the user as addressee in Step (61).

When the user designates unopened mail(s) in Step (62), the mail controller 22 activates the tree controller 24. The tree controller 24 is notified of the ID number of the node attached to the designated mail and the number of the project to which the node belongs, and is executed to obtain all the attribute data of all the nodes to which the project belongs by data retrieval in the database 1a, and display a tree image representing the project on the screen by, for example, inverting color of the node to notify the user of arrival of the mail in Step (63). Similarly to Steps (44) and (45) in FIG. 7, the node is selected, and the mail data file is downloaded via the mail file controller 37 in Steps (64) and (65) in FIG. 9. In this way, the user can view the mail data file and re-use the same when needs arises to do so.

As mentioned above, the mail sending and mail receiving are carried out in association with a specific node of a tree each representing an individual project. Accordingly, the user does not have to rearrange and sort out mails irrespective of whether the user is a mail sender or a mail receiver.

The document file administrative system enables the user to store CAD data created in the client computer 3 in the auxiliary file 1b of the server computer 1 as backup data, and store message data included in the CAD data as text data in the database 1a to facilitate the user to retrieve and re-use the CAD data.

Figure 10:
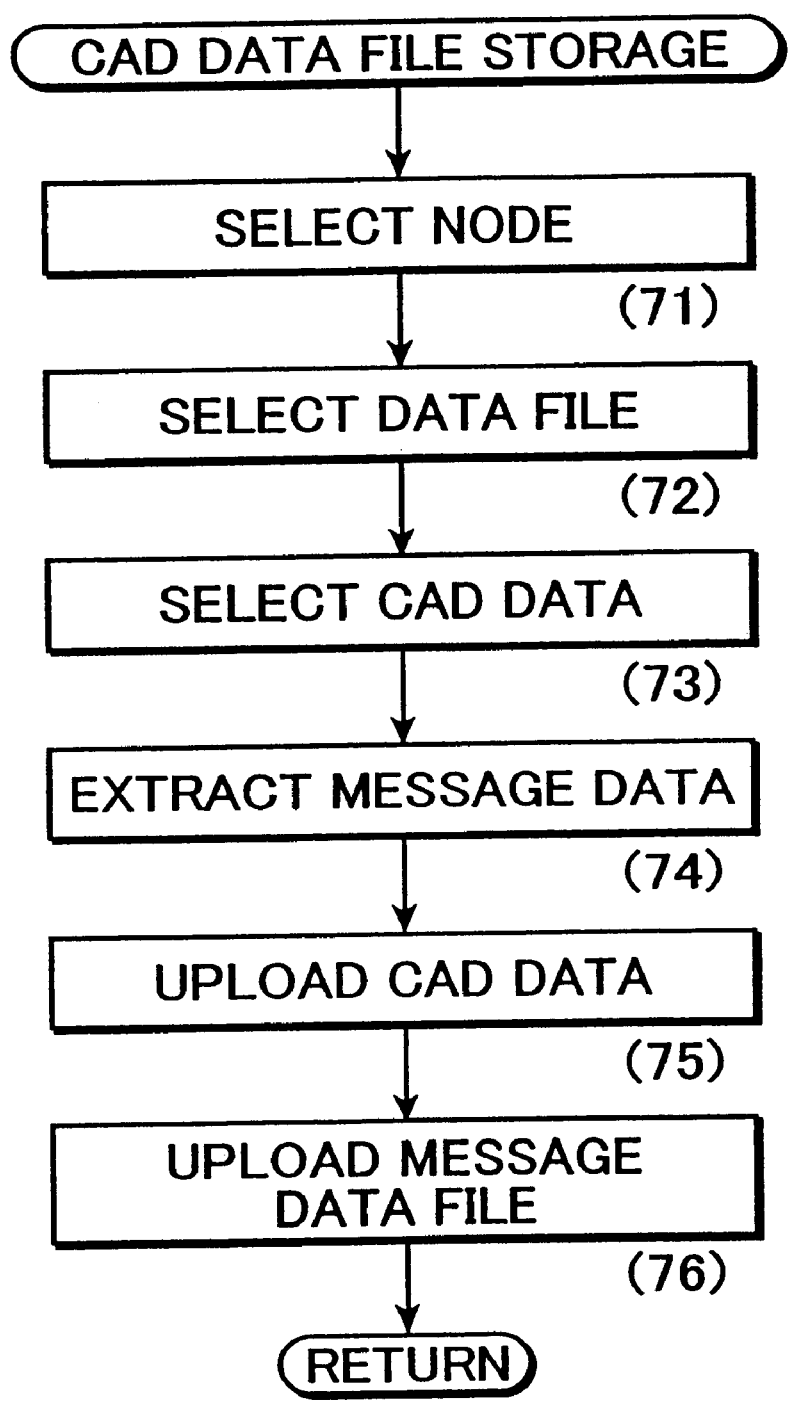
FIG. 10 is a flowchart showing a CAD data file storage routine of the document file administrative system.

Specifically, in a CAD data file storage routine shown in FIG. 10, when the user selects one of the nodes of the tree image displayed on the screen in Step (71), the tree controller 24 notifies the main controller 11 of the ID number of the selected node. The main controller 11 controls the node selector 25 to display a query screen image to allow the user to select the kind of document data file. In this case, a CAD data file is selected in Step (72).

When a CAD data file is selected in Step (72), the node selector 25 is executed to demand selection of CAD data.

The user selects desired one of a number of CAD data files stored in the client computer 3 in Step (73). The access of the user to the memory of the client computer 3 may be preferably managed by a public key encryption system. The node selector 25 activates the CAD file controller 38 to read the CAD data from the memory and extract message data included in the CAD data in Step (74). At the same time, the entirety of the CAD data is stored or uploaded in the auxiliary file 1b of the server computer 1 as backup data in Step (75). Thereafter, the CAD file controller 38 transfers the title of the backup CAD data to the node selector 25 and suspends its operation.

The node selector 25 activates the text file controller 35 to attach the extracted message data with a server address (URL) of the CAD data stored in the auxiliary file 1b of the server computer 1, the ID number of the node selected in Step (71), and the number of the project to which the node belongs to create a message data file for the CAD data, and stores or uploads the message data file as text data in the database 1a in Step (76). In this way, the document file administrative system enables the user to handle the text data including the message data of the CAD data, namely, the message data relating to drawings created by CAD as text data by cooperative operation of the node selector 25, the CAD file controller 38, and the text file controller 35.

A CAD data file retrieval routine is described with reference to FIG. 11. When the user gives a retrieval command to the client computer 3 via the project controller 23, the searcher 31 is activated to demand inputting of a search term. When the user inputs a search term in Step (81), the searcher 31 searches for a message data file having the search term from a number of message data files for CAD data files stored in the database 1a in Step (76) in FIG. 10, i.e., data files having full messages corresponding to CAD data files stored in the auxiliary file 1b of the server computer 1, in Step (82). The searcher 31 is executed to obtain the project number and the node ID number based on the hit message data file, and notify the node selector 25 of the node ID number, and the searching operation is suspended. The node selector 25 activates the text file controller 35 to retrieve the text data file from the database 1a by reference to the node ID number, and obtains the server address for the CAD data file corresponding to the message data file.

Subsequently, the node selector 25 activates the CAD file controller 38 to download the CAD data file from the auxiliary file 1b of the server computer 1 based on the obtained server address in Step (83). Thereafter, the CAD file controller 38 activates a CAD viewer which matches with the CAD data file stored in the client computer 3 in Step (84). The CAD viewer processes the obtained CAD data file into drawing images, namely is executed to display drawings on the screen, thereby enabling the user to view drawings on the screen. The user can correct and revise a displayed drawing by activating a CAD program suitable for the downloaded CAD data file.

Similarly to the CAD data file storage, the document file administrative system also enables the user to administratively store external data file which is created and stored by an application program independently installed in a client computer 3 as backup data in the auxiliary file 1b of the server computer 1 so that the user can easily retrieve and re-use the external data file.

Figure 12:
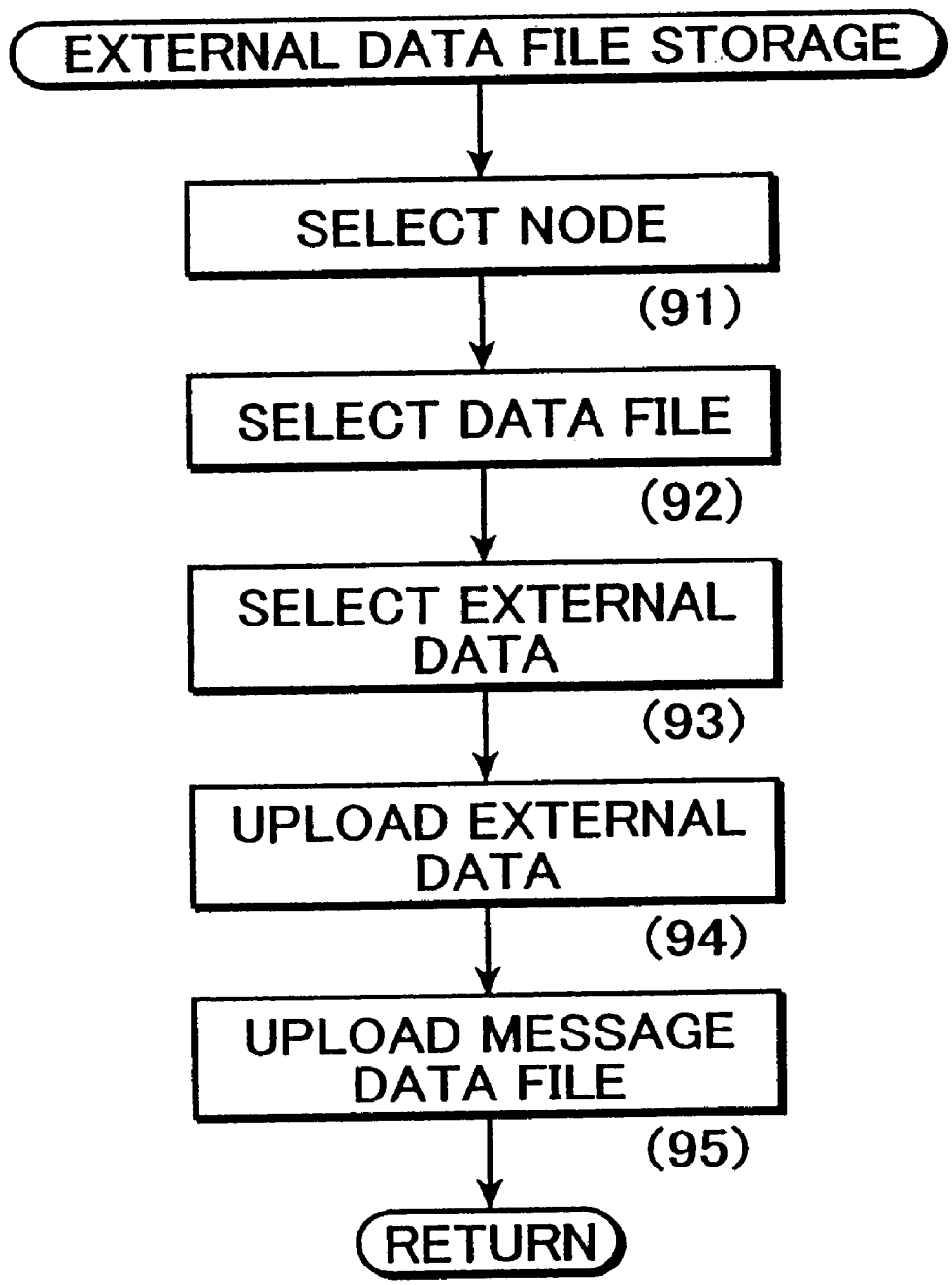
FIG. 12 is a flowchart showing an external data file storage routine of the document file administrative system.

In an external data file storage routine shown in FIG. 12, when the user selects one of nodes of a tree image displayed on the screen in Step (91), the tree controller 24 notifies the main controller 11 of the ID number of the selected node. The main controller 11 controls the node selector 25 to display a query screen image to allow the user to select the kind of data file in Step (92). In this case, the message data file for an external data file is selected.

When the message data file for an external data file is selected in Step (92), the node selector 25 is executed to demand selection of external data file. The user selects one of a plurality of external data files stored in the memory of the client computer 3 in Step (93). The access of the user to the memory of the client computer 3 may be controlled by a public key encryption system. Thereafter, the node selector 25 activates the external file controller 39 to read out the selected external data from the memory, and store or upload the selected external data as an external data file in the auxiliary file 1b of the server computer 1 in Step (94). The external file controller 39 notifies the node selector 25 of the name of the external data file that has been stored in the auxiliary file 1b, and suspends its operation.

The node selector 25 activates the text file controller 35 to attach the server address (URL) of the auxiliary file 1b of the server 1 that stores the external data file, the ID number of the node that has been selected in Step (91), and the number of the project to which the node belongs to the name of the external data file to create a statement data file for the external data file, and stores or uploads the statement data file in the form of text data in the database 1a in Step (95). In this way, the document file administrative system enables the user to handle the statement data file attached with the name of the external data file as text data by cooperative operation of the node selector 25, the external file controller 39, and the text file controller 35.

An external data file retrieval routine is described with reference to FIG. 13. When the user gives an external data file retrieval command via the project controller 23, the searcher 31 is activated to demand inputting of a search term. When the user inputs a search term in Step (101), the searcher 31 is executed to search for a statement data file from the database 1a in Step (95) based on the name of the external data file or the title of the node that has been selected in Step (91) in FIG. 12, and obtain the project number and the node ID number that have been attached to the hit statement data file. The searcher 31 then is executed to notify the node selector 25 of the obtained node ID number and suspends its operation.

The node selector activates the text file controller 35 to search for a statement data file from the database 1a based on the node ID number, reads out the server address of the statement data file, and suspends its operation. The node selector 25 activates the external file controller 39 to download the external data file from the auxiliary file 1b of the server computer 1 by utilizing the obtained server address in Step (103). The user can view the downloaded external data file and re-use the external data file by correcting and editing the data file according to needs.

Figure 11:
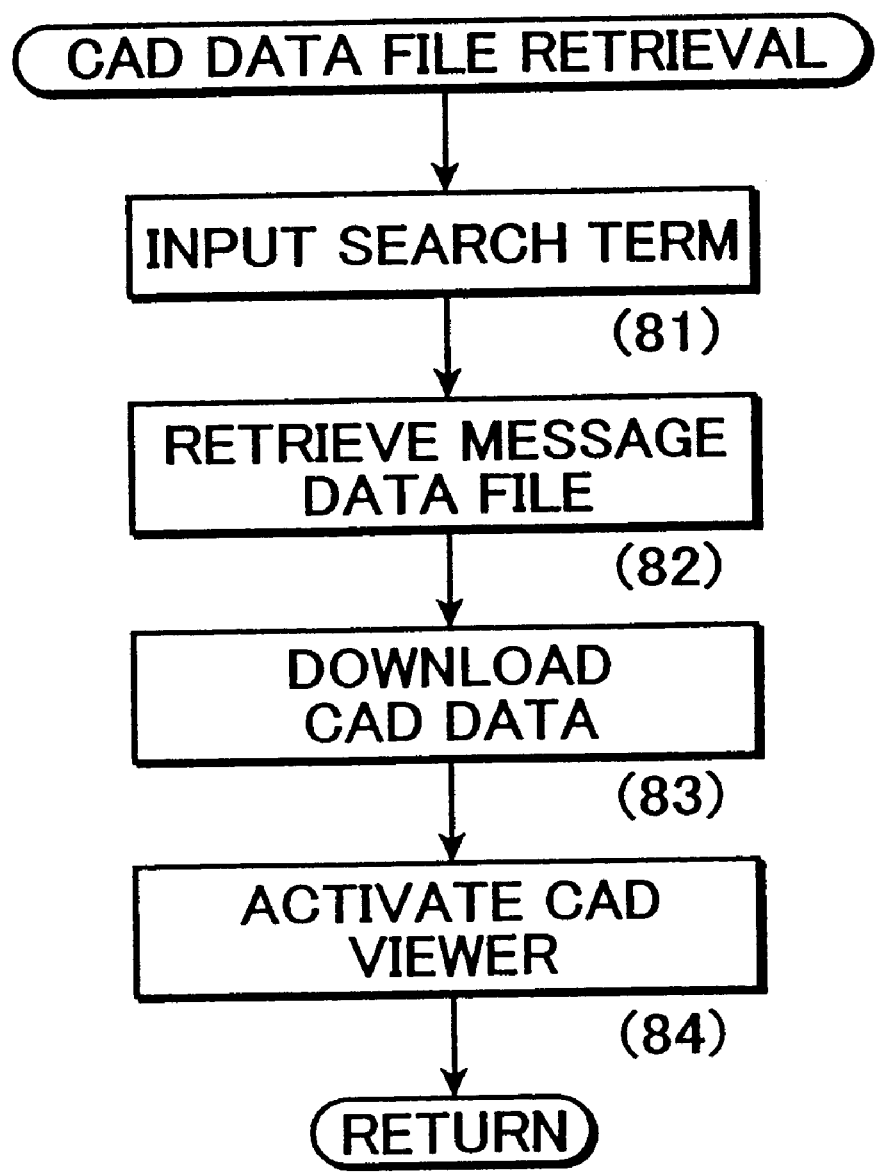
FIG. 11 is a flowchart showing a CAD data file retrieval routine of the document file administrative system.
Figure 13:
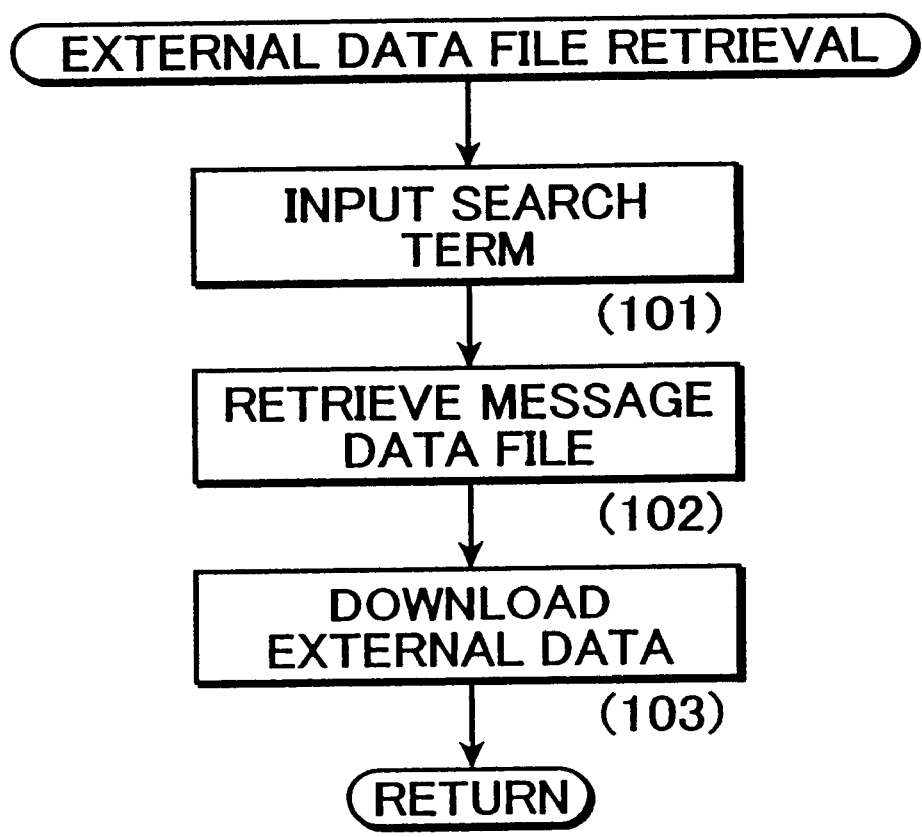
FIG. 13 is a flowchart showing an external data file retrieval routine of the document file administrative system.

Steps corresponding to Steps (43) and (44) may be inserted between Steps (82) and (83) in FIG. 11, and between Steps (102) and (103) in FIG. 13. In the altered routine, upon retrieval of the statement data file from the database 1a, the searcher 31 is executed to notify the tree controller 24 of the ID number of the node attached to the hit statement data file and the number of the project to which the node belongs. The tree controller 24 is executed to obtain all the attribute data of all the nodes belonging to the project and display an image of the tree representing the project on the screen of the client computer 3 by inverting the color of the node attached to the hit statement data file. Subsequently, when the user selects the color-inverted node, the corresponding CAD data file or external data file can be downloaded via the CAD file controller 38 or the external file controller 39.

Figure 14:
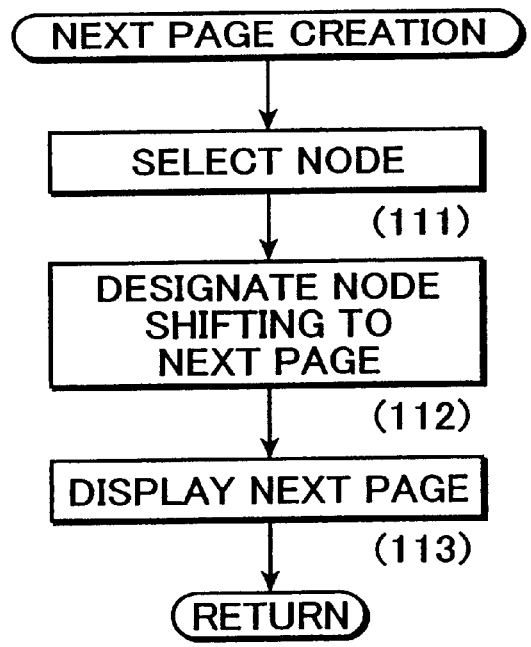
FIG. 14 is a flowchart showing a next page creation routine of the document file administrative system.

The document file administrative system enables the user to shift a series of nodes starting from a certain node to a next page by selectively designating one of the nodes of the tree image displayed on the screen of the client computer 3. A next page creation is described with reference to FIG. 14 showing a flowchart of a next page creation routine and FIG. 15.

When the user selects one of the nodes of the tree image in Step (111), and gives a command of node shifting to a next page in Step (112), the tree controller 24 activates the page changer 34, and notifies the page changer 34 of the number of the project to which the tree belongs, and the ID number of the selected node. The page changer 34 is executed to obtain all the attribute data of a series of nodes starting from the selected node from the database 1a based on the project number and the node ID number, and notify the tree controller 24 of the result of retrieval. The tree controller 24 is executed to display the series of nodes starting from the selected node in the form of a tree image as a new page on the screen of the client computer 3 in Step (113).

The page changer 34 is executed to attach the number of the new page to the attribute data of the series of nodes and update the attribute data of the corresponding nodes in the database 1a when notifying the tree controller 24 of the attribute data of the series of nodes. The tree controller 24 is executed to add the number of the new page to the attribute data of the new node when the new node is added on the displayed new screen. The document file administrative system enables the user to display the tree image on a plurality of pages by cooperative operation of the tree controller 24 and the page changer 34.

The user can desirably decrease the number of pages each carrying a tree image by selectively shifting an uppermost node of the tree displayed on an under page (second page) to a top page (first page). When the user demands on the client computer 3 of displaying the tree image having a specific node from the searcher 31 (for example, in Step (43) in FIG. 7) or the mail controller 22 (for example, Step (63) in FIG. 9) during the tree image display over a plurality of pages, the tree controller 24 is executed to selectively display the tree image on the screen by selecting the page(s) carrying the tree image having the selected node.

Figure 15:
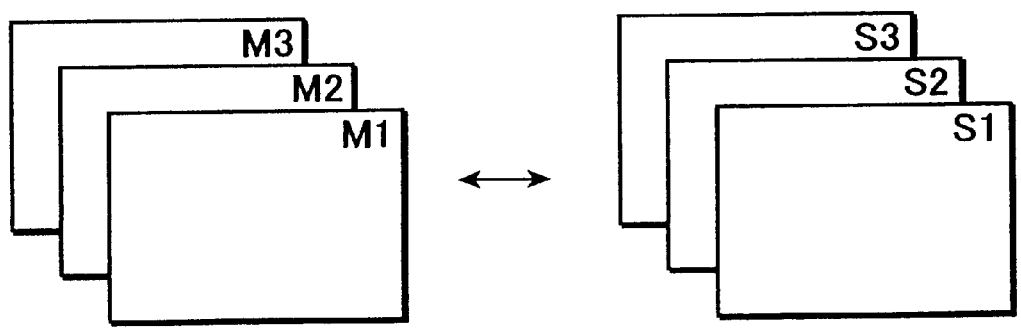
FIG. 15 is a conceptual diagram showing a relationship between pages displayed on a screen and hypothetical pages of side frames.

When a tree image is displayed on the screen of the client computer 3 (for example, in Step (14) in FIG. 3 or Step (113) in FIG. 14), the tree controller 24 is executed to automatically generate side frames as hypothetical pages Si (i=1, 2, . . . ) which respectively correspond to pages Mi (i=1, 2, . . . ) on which the tree image is displayed, as shown in FIG. 15.

When command of displaying a side frame is given by the user, the tree controller 24 activates the side frame controller 33, which in turn demands the page changer 34 to retrieve data relating to page Si of the designated side frame which corresponds to page Mi carrying the tree image currently displayed on the screen. The page changer 34 obtains all the attribute data of all the nodes on page Si of the designated side frame, and notifies the obtained data to the side frame controller 33. The side frame controller 33 is executed to display the tree image corresponding to data which is contained in page Si of the designated side frame.

As mentioned above, the document file administrative system enables the user to temporarily store a single node, a group of nodes interrelated to one another, and a data file attached with the node by utilizing page Si of the side frame.

Further, the system enables the user to duplicate a node or nodes in page Si of the side frame when needs arises to re-use the node(s) of the tree representing the other project and the document file belonging to the node. Also, the system enables the user to shift nodes in page Si to the corresponding page Mi along with document data files attached with the node and vice versa.

The bookmarker 32 is executed to store the project number and the user ID number as a pair in the database 1a upon given command of bookmark registration via the project controller 23. After activation of the password checker 21 under the activation of the system in Step (11) in FIG. 3, the project controller 23 is executed to retrieve data from the database 1a by reference to the user ID number, and stores a result of retrieval in the form of a list. Thus, the system enables the user to expedite handling of projects by allowing the user to select a certain project from the displayed list in Step (13) in FIG. 3.

The project selection in Step (13) can be utilized as full text retrieval with respect to a document data file by the searcher 31. Specifically, when command of full text retrieval by the searcher 31 is given via the project controller 23 at least one of statement data files, table data file, mail data file, message data files for external data file, and message data files for CAD data files, and the node title, the project controller 23 is executed to display a list of all the projects to which nodes attached to the hit document data file belong or nodes having the hit title belong. When the list is displayed, the user selects a certain project from the list to display the tree image representing the selected project. At this time, the tree image is displayed by inverting the color of the node attached to the hit document data file.

Referring back to the node shifting and the node duplication, the node shifting routine and the node duplication routine are described with reference to FIGS. 16 and 17, respectively.

The system enables the user to implement node shifting in such a manner that when the user selects two nodes of a tree image displayed on the screen, the user can connect a series of nodes starting from one (leader node) to the other one. Specifically, in the node shifting routine shown in FIG. 16, when the user selects two nodes of the tree image displayed on the screen and designates one of the two nodes as a leader note in Step (121), the node selector 25 is executed to obtain attribute data of the leader node from the database 1a, change or update the ID number of the parent node including the leader node to the ID number of the other one of the two nodes, and store the changed ID number in the database 1a. Thereafter, the node selector 25 activates the tree controller 24 to display the tree image, and suspends its operation.

Figure 16:
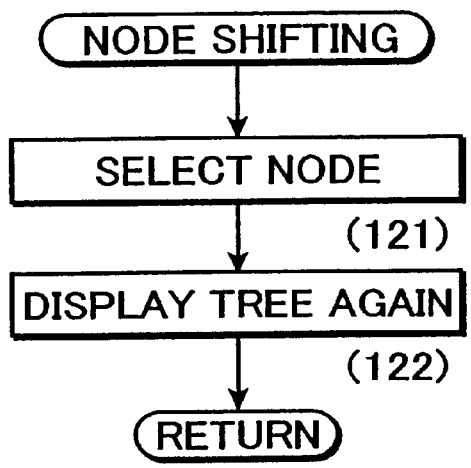
FIG. 16 is a flowchart showing a node shifting routine of the document file administrative system.
Figure 17:
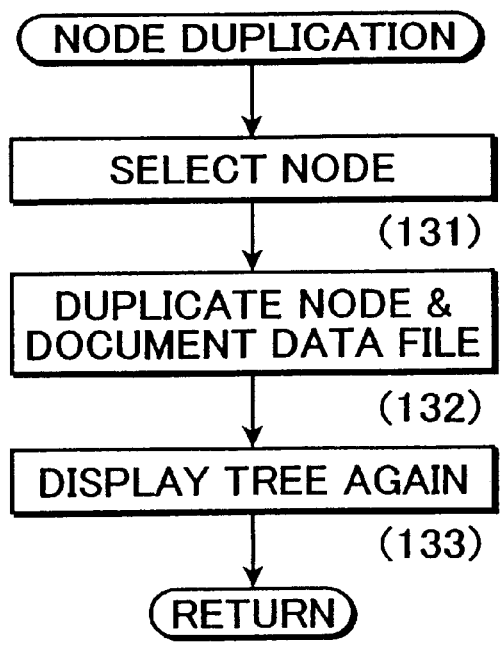
FIG. 17 is a flowchart showing a node duplication routine of the document file administrative system.

The tree controller 24 is executed to retrieve all the attribute data of all the nodes carrying the project number and the page number from the database 1a by reference to the project number and the page number of the project displayed on the screen, and display the tree image again on the screen in Step (122) in FIG. 16. The new tree image displayed at this stage is such that a series of nodes starting including the one of the two nodes selected as the leader node in Step (121) are shifted on the same tree by connecting the leader node to the other one of the two nodes.

The series of nodes after the node shifting are accompanied by document data files attached to the series of nodes before the node shifting. Further, there is no likelihood that the relationship between the nodes of the series of nodes after the node shifting is lost. The series of nodes after the node shifting are different from those before the node shifting in that the ID number of the parent node is changed.

As mentioned above, the system enables the user to implement the node shifting in which nodes of a tree image displayed on the screen can be shifted in the same tree together with document data files attached with the node by cooperative operation of the node selector 25 and the tree controller 24. However, this node shifting is limited within the same page carrying the same tree.

The system also enables the user to implement node duplication in such a manner that when the user selects two nodes respectively from tree images on different pages, the user can connect a series of nodes starting from one (leader node) of a tree on one page to a node of a tree on another page. Specifically, in the node duplication routine shown in FIG. 17, when the user selects respective two nodes from tree images on different pages and selects one of the two nodes as a leader node in Step (131), the node selector 25 is executed to obtain attribute data of a series of nodes starting from the leader node and document data files belonging to the series of nodes from the database 1a, change or update the ID number of the leader node (parent node) to the ID number of the other node in the other tree, attach all of the series of nodes with the ID number of the other tree, change or update the project number and page number of the project to which the series of nodes have belonged to those of the other tree, and change or update the node ID number of document data files belonging to the series of nodes to the ID number of the other tree, and store the updated data in the database 1a. In other words, the node selector 25 is executed to duplicate the series of nodes starting from the leader node in the tree which have been selected in Step (131) and the document data files belonging to these nodes to the other tree, and store the duplicated data in the database 1a in Step (132), notifies the tree controller 24 of the project number and page number of the project of the other tree, and suspends its operation.

Upon receiving the notification from the node selector 25, the tree controller 24 is executed to retrieve all the attribute data of all the nodes belonging to the project on the displayed page from the database 1a by reference to the project number and the page number carrying the designated project, and display the tree image again on the screen in Step (133).

In this way, the document file administrative system enables the user to implement node duplication in which a node of a tree on one page is duplicated onto a node of a tree on another page together with document data files attached with the nodes by cooperative operation of the node selector 25 and the tree controller 24.

The series of nodes after the node duplication are attached with the document data files which have been attached to the series of nodes before the node duplication. The relationship between the series of nodes before and after the node duplication is not lost. The node duplication can be implemented between any pages irrespective of whether the leader node and the destination node belong to the same project or not.

This invention is not only applicable to administration of document file which is handled in a company but also applicable to any case as far as huge amounts of document file is stored and retrieved in and out from a database.

A modified embodiment is described with reference to FIGS. 18 to 23. It should be noted that parts in the modified embodiment which are identical to those in the foregoing embodiment are denoted at the same reference numerals as those in the embodiment.

In a document file administrative system as the modified embodiment, the client computer 3 is equipped with a password controller 26 in place of the password checker 21. The server computer 1 is equipped with a password checker 41 and an access controller 42. With this arrangement, the system is an open system which is accessible from a multitude of unspecified users.

The server computer 1 is also equipped with a database 51 for storing data for identifying users, databases 52 each provided for a group of users which are independently executed like a hardware, a database 53 for storing data relating to a public project which is commonly usable among users, and a database 54 for accumulating information relating to fees in the case where need arises to charge the user for fee for using a document data file belonging to the public project. The databases 52 and 53 respectively correspond to the database 1a and the auxiliary file 1b in FIG. 1.

Figure 19:
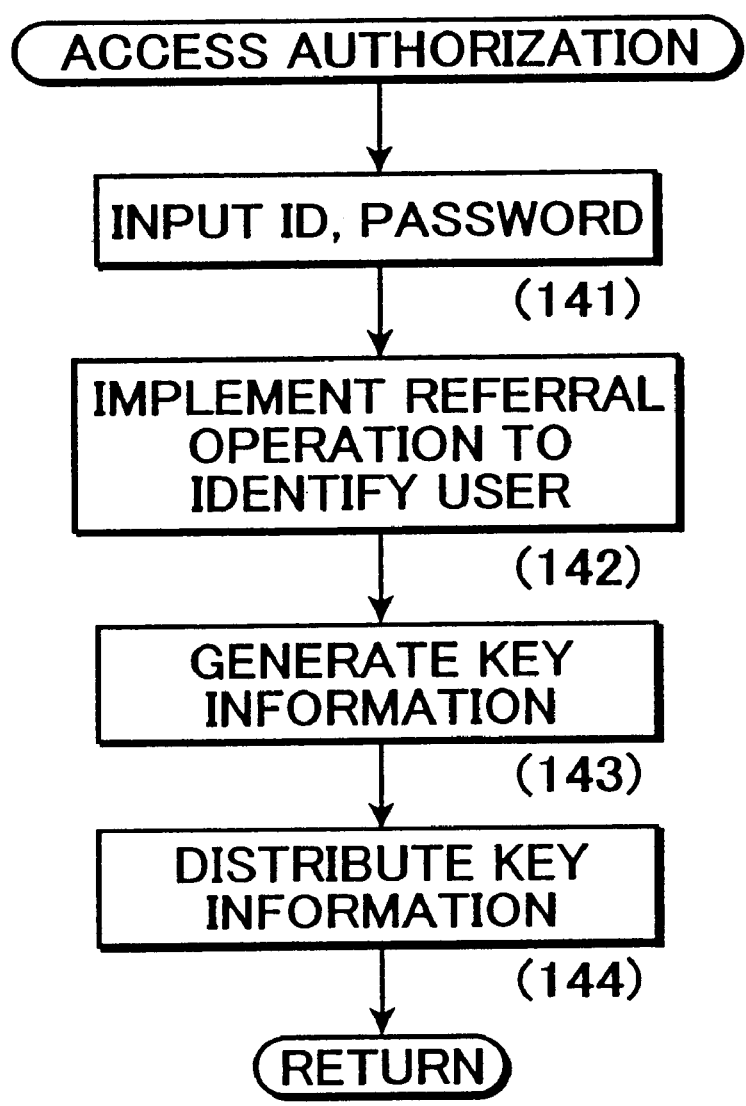
FIG. 19 is a flowchart showing an access permission routine of the modified document file administrative system.

First, an access permission routine is described with reference to FIG. 19. When the user designates start-up of the system, the main controller 11 activates the password controller 26 to display a query screen image of demanding inputting of a user ID number and a password. When the user inputs the user ID number and the password in Step (141), the password controller 26 sends the inputted user ID number and the password to the password checker 41 of the server computer 1 via the network 2. The password checker 41 is executed to make a referral operation to the database 51 to identify the user, namely, confirm whether the user is authorized to access to one of the databases 52 in the server computer 1 in Step (142). When it is judged that the user is authorized to access to the database 52, the password checker 41 is executed to obtain the name of the specific database 52 to which the user is authorized to access, communication protocol of the specific database 52, and the authority level allowed for the user, and generate key information along with the user ID number and the password in Step (143).

Subsequently, the password checker 41 is executed to send the generated key information to the password controller 26 of the client computer 3 via the network 2, and to the access controller 42 of the server computer 1 in Step (144). The password controller 26 is executed to send the key information that has been sent from the password checker 41 (namely, from the server computer 1) to the main controller 11, which in turn distributes the key information to the mail controller 22, the project controller 23, the tree controller 24, and the node selector 25, and suspends its operation in Step (144). Next, a database access routine is described with reference to FIG. 20. When the user wants to access to the specific database 52 in the server computer 1 through his client computer 3, the client computer 3 is operated in such a manner that the key information that has been distributed to the mail controller 22, the project controller 23, the tree controller 24, and the node selector 25 is sent to the access controller 42 of the server computer 1. The access controller 42 is executed to confirm whether the key information sent from the client computer 3 is identical to the key information that has been sent from the password checker 41. When it is judged that these key information coincide with each other, the access controller 42 is executed to authorize the user to access to the specific database 52.

Figure 20:
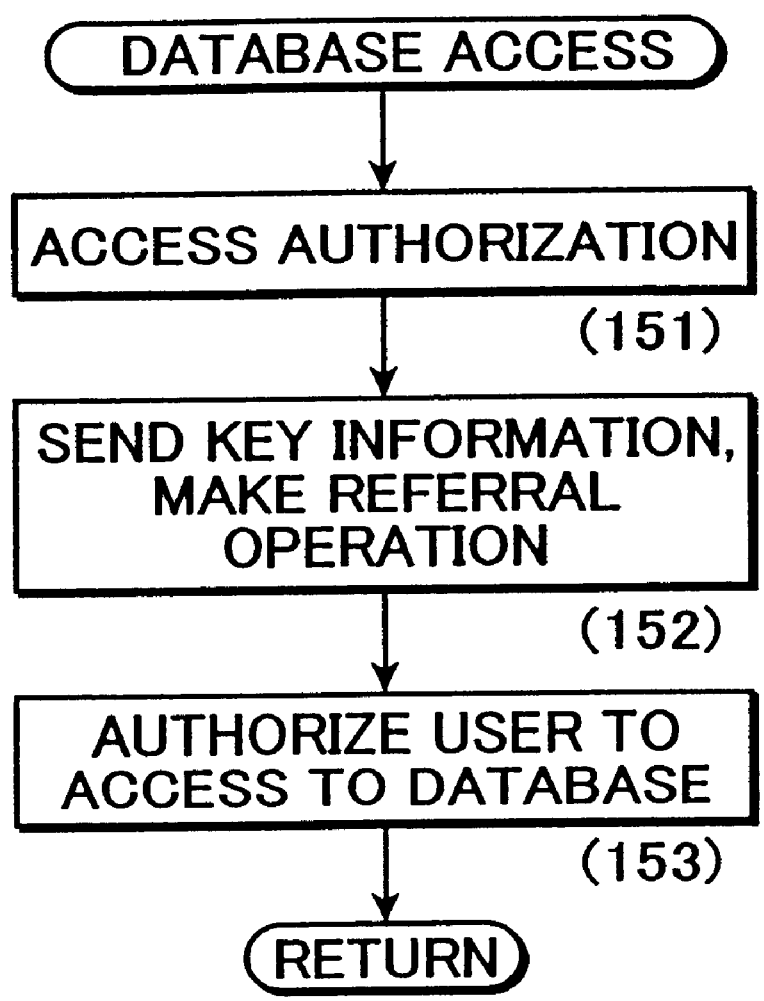
FIG. 20 is a flowchart showing a database access routine of the modified document file administrative system.

For example, when the user activates one of the subordinate controllers (the mail controllers 22, the project controller 23, the tree controller 24, and the node selector 25) via the main controller 11, the activated subordinate controller is executed to implement a sub-routine of access permission via the main controller 11 and the password controller 26 in Step (151) in FIG. 20. In Step (151), the sub-routine of FIG. 19 is performed. When the access permission sub-routine in Step (151) is implemented, the user ID number and the password are automatically inputted to the password controller 26 in Step (141) in FIG. 19 since the system has already been started up.

The activated subordinate controller is executed to send the key information that has been sent from the server computer 1 to the access controller 42 of the server computer 1 via the password checker 41, the password controller 26, and the main controller 11 in Step (152). The access controller 42 is executed to implement a referral operation of the key information according to the aforementioned procedure in Step (152), and access to the database 52 in Step (153). The access controller 42 is executed to send the key information sent from the database 52 to the activated subordinate controller which has demanded the information via the network 2, and suspends its operation.

In this way, the sub-routine of access permission in Step (151) is implemented each time the database 52 is accessed. With this construction, the server computer 1 is executed to rewrite the communication protocol of each of the databases 52 at a predetermined time interval via a stored procedure (not shown), thereby improving the security level of the document file administrative system.

The document file administrative system also enables the user to register a project that has been created and stored in the database 52 as a public project to allow other users to utilize or re-use the project. A public project registration routine is described with reference to FIG. 21. When the user activates the project controller 23, and designates a project in Step (161), the project controller 23 is executed to implement the sub-routine of access permission via the password controller 26 in Step (162), and make a referral operation of certain key information via the access controller 42 in Step (163), and obtain information relating to the designated project from the database 52 in Step (164). Upon confirming that the project information has been obtained in Step (164), the project controller 23 is executed to implement a referral operation of certain key information via the access controller 42 in Step (165), access to the database 53 designed for the public project, and store the information relating to the designated project in the database 53 in Step (166). The communication protocol of the database 53 is set so that the public project is accessible from any one of a multitude of users who are authorized to use the project.

Figure 21:
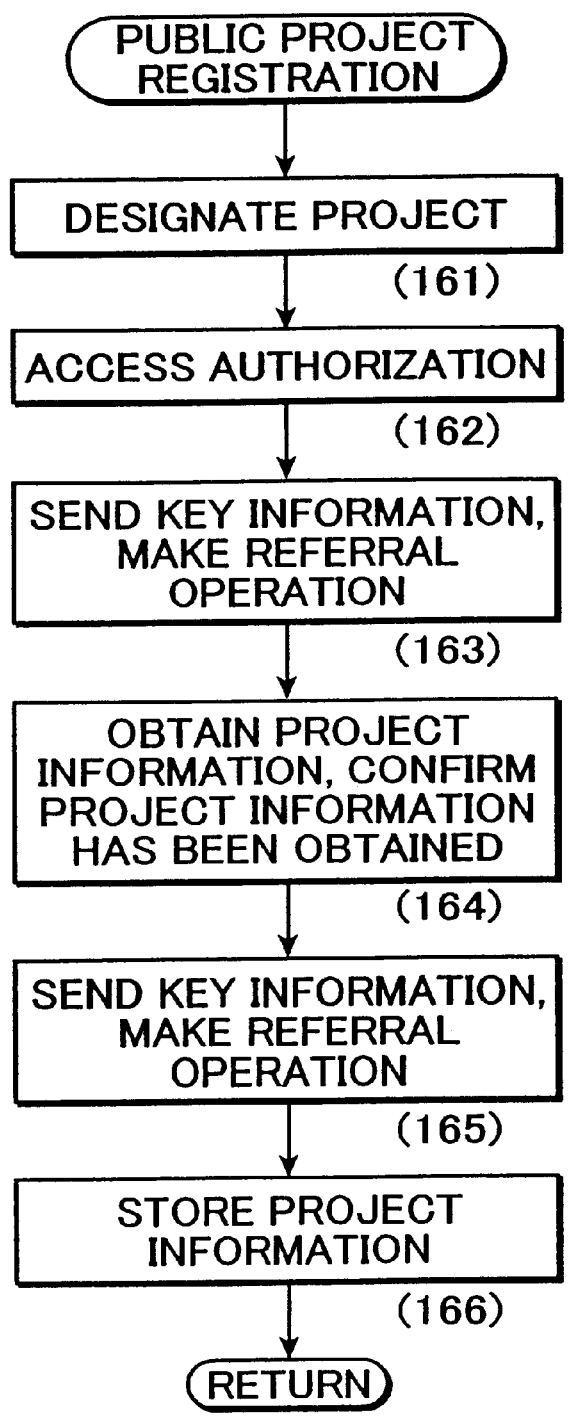
FIG. 21 is a flowchart showing a public project registration routine of the modified information administrative system.
Figure 22:
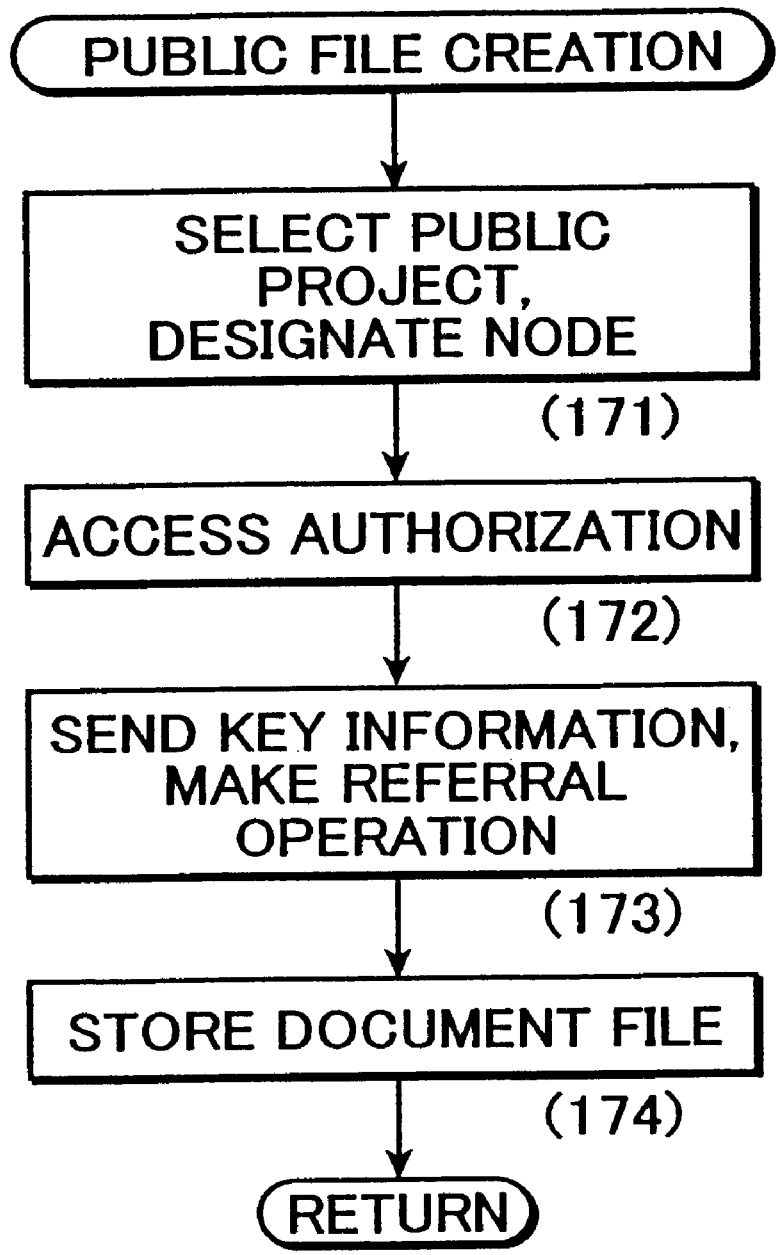
FIG. 22 is a flowchart showing a public file creation routine of the modified document file administrative system.

In the projection designation in Step (161) in FIG. 21, different levels of disclosure can be selected such that the entirety of the project is disclosed, or the tree of the project is disclosed, or part or all of the document data files belonging to the nodes of the tree representing the project are disclosed. A determination as to whether re-use of document data files for public use by other users is charged for or not is individually set with respect to the document data file. A list of information relating to projects that have been stored in the database 53 in Step (166) and registered as a public project is automatically provided to the users from the server computer 1.

The document file administrative system enables the user to store document data files in the database 53 in association with each of the nodes of a tree representing a public project which the user himself has registered to allow other users to utilize the document data file as a public file. A public file creation routine is described with reference to FIG. 22. Specifically, when the user selects a public project and designates a specific node of a tree representing a public project in Step (171), the node selector 25 is activated to implement the sub-routine of access permission via the password controller 26 in Step (172), make a referral operation of certain key information via the access controller 42 in Step (173), and access to the database 53 to store a certain document data file in the database 53 in Step (174).

Document data files to be stored in the database 53 in Step (174) are document data files which are created in the client computer 3. Document data files to be stored may be newly created in the client computer 3, or may be those which are partly given some changes to document data files taken out from the database 52 or 53 according to the procedure in FIG. 20. In other words, the system enables the user to update a document data file belonging to the public project which has been registered in the database 53. The node to be designated in Step (171) may be an already existing node in the public project or a new node which does not exist in the public project and is to be newly added to the public project.

The system also enables the user to duplicate the entirety or part of the public project that has been registered by other user to allow the user to utilize or re-use the public project. A public project utilization routine is described with reference to FIG. 23. Specifically, when the user selects a public project, and designates the name of a project to which the public project is to be duplicated for utilization in Step (181), the project controller 23 is activated to implement the sub-routine of access permission via the password controller 26 in Step (182), make a referral operation of certain key information via the access controller 42 in Step (183), and access to the database 53 to obtain information relating to the selected public project in Step (184). Thereupon, the tree controller 24 is activated to make a referral operation of certain key information via the access controller 42 in Step (185), and access to the database 53 to obtain information relating to all the nodes belonging to the public project in Step (186).

Figure 23:
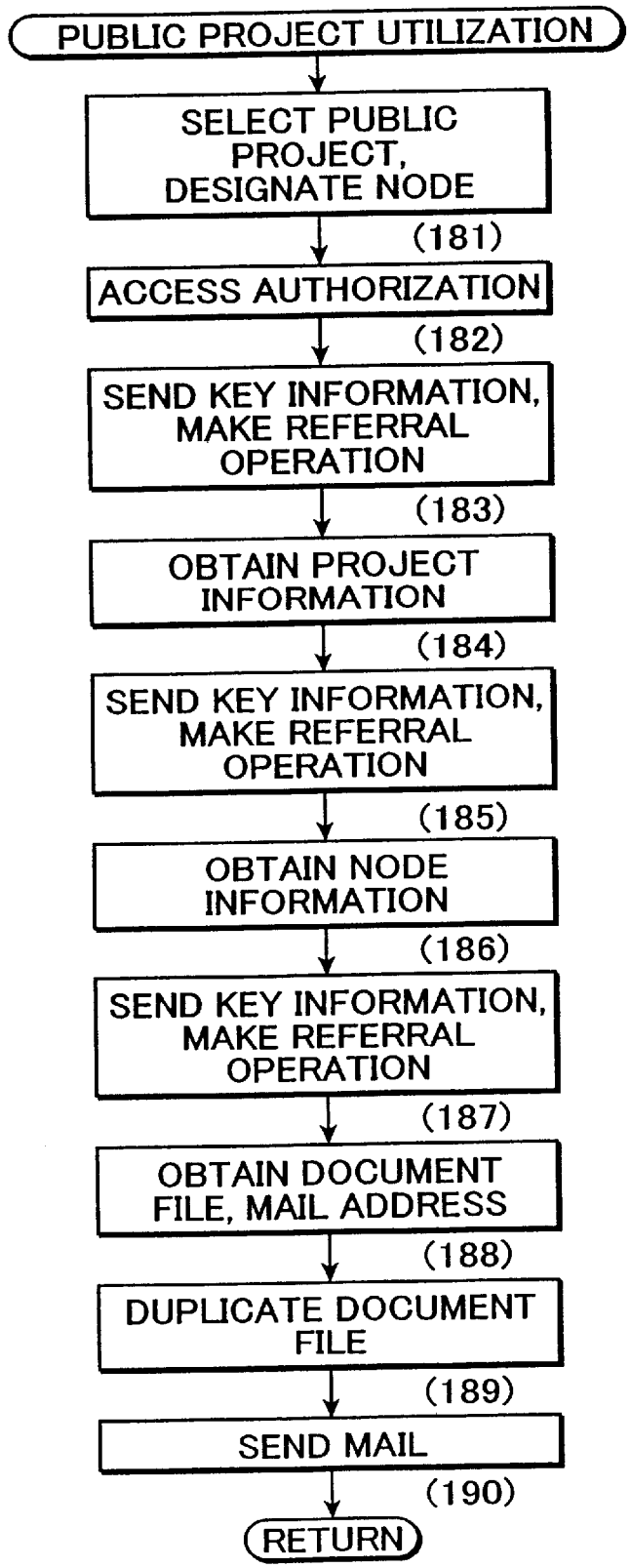
FIG. 23 is a flowchart showing a public project utilization routine of the modified document file administrative system.

The node selector 25 is activated to make a referral operation of certain key information via the access controller 42 in Step (187), obtain document data files belonging to each of nodes of the tree representing the public project and the mail address of the user who registered the public project from the database 53 in Step (188), and duplicate the information relating to the public project such as the node information along with the document data files to the project to which the public project duplication has been designated in Step (189). After the duplication in Step (189), in Step (190), the node selector 25 activates the mail controller 22 to automatically send data such as the ID number of the user who utilizes or re-uses the public project, the name of the group to which the user belongs, the name of the public project utilized by the user, and the date of the utilization to the mail address obtained in Step (188). The mail address of the user who registered the public project is stored in the database 53 in association with the public project or the document data files when registering the public project or storing the document data file in Step (166) in FIG. 21 or in Step (174) in FIG. 22. The operations of Steps (187) and (188) in FIG. 23 are implemented when need arises to do so. In this way, the system also enables the user to utilize or re-use the public project merely by duplicating the tree representing the public project. Alternatively, node(s) of a part of the tree representing the public project can be designated to allow the user to duplicate the document file(s) belonging to the designated node(s).

Figure 24A:
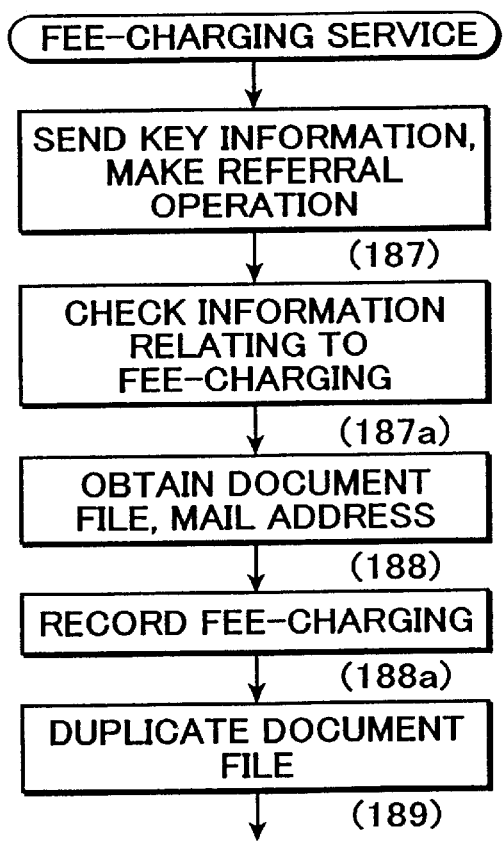
FIG. 24A is a flowchart showing a fee-charging service routine of the modified document file administrative system.

In the case where duplication of document data files belonging to the node of the tree representing the public project is charged for, a fee-charging service routine shown in the left-side flowchart in FIG. 24A is implemented. The fee-charging service routine of FIG. 24A is such that Steps (187a) and (188a) are inserted respectively between Steps (187) and (188), and between Steps (188) and (189) in FIG. 23. Accordingly, description of operations of steps other than Steps (187a) and (188a) is omitted.

Specifically, in the fee-charging service routine of FIG. 24A, the access controller 42 is executed to access to the database 54 designed for storing information relating to fee-charging, and send the information relating to the node of the public project for duplication and the ID number of the document file belonging to the node to the database 54 in Step (187a). The document file in Step (187a) is fee-charged. After confirming that the node selector 25 actually obtained the document data file in Step (188) in FIG. 24A, the database 54 is executed to implement fee-charging operation to the user carrying the user ID included in the key information, and store the record on fee-charging therein in Step (188a). The document file administrative system makes it possible to implement fee-charging to the user who duplicated and re-used fee-charged document data files belonging to the public project.

Figure 24B:
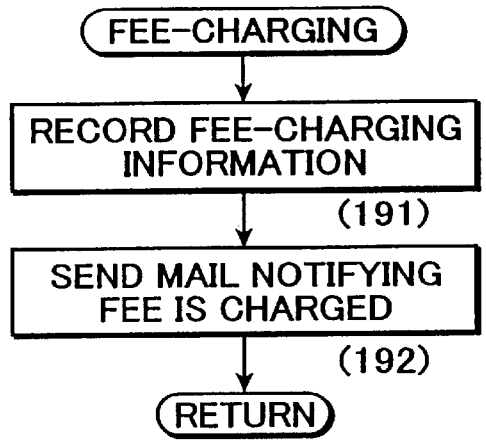
FIG. 24B is a flowchart showing a fee-charging routine of the modified document file administrative system.

A fee-charging routine is described with reference to the right-side flowchart shown in FIG. 24B. In the fee-charging routine of FIG. 24B, records relating to fee-charging in the database 54 is regularly collected in an auxiliary routine in Step (191), and a mail notifying that a fee is charged for the service of providing the document data file is automatically sent to the user who used the fee-charged document data file in Step (192).

Figure 18:
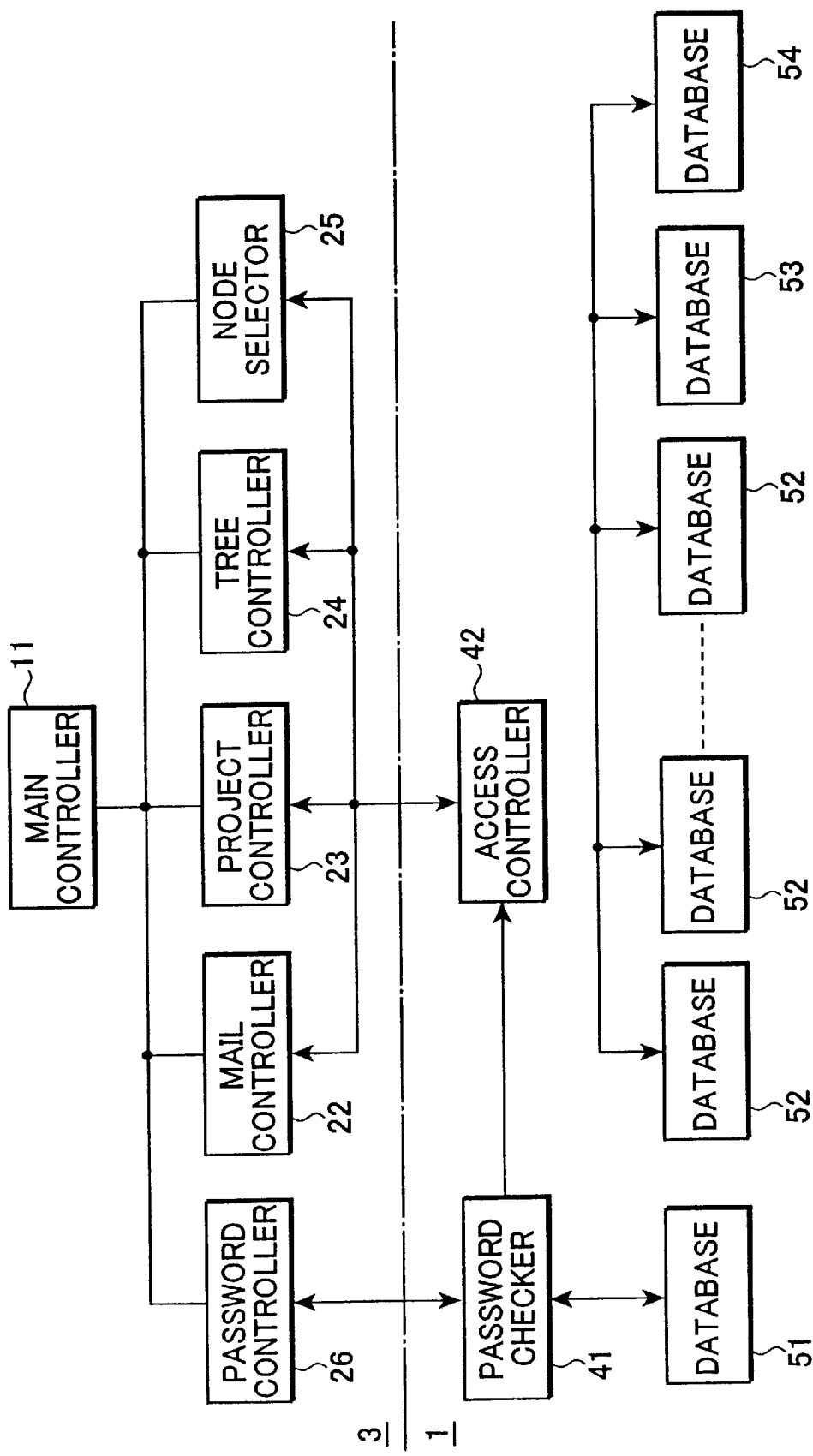
FIG. 18 is a block diagram showing a modified document file administrative system.

It may be preferable that the databases 51, 52, 53, and 54 in FIG. 18 are used as individual database servers in the server computer 1 in combination with an independently operated computer and a memory.

As described above, an inventive computer-based document file administrative system is provided with a tree edition component for allowing a user to create and edit a tree representing a project on a display, the tree having one or more nodes; a document file edition component for allowing a user to create and edit a document file, and to associate the document file with a node of the tree by an attribute relating to the node, and to store the associated document file in a memory; and a search component for searching out a document file from document files stored in the memory based on a given attribute, and represents the presence of searched out document file in connection with the corresponding node.

The attribute may preferably be the form of text data. The document files may include at least one of a statement file in the form of text data, a table file having table computation function and text data, a mail file including text data, an external file having a message in the form of text data, and a CAD file having a message in the form of text data.

The search component may search out a document file based on text data of the statement file, table file, mail file, external file, and CAD file in addition to the attribute.

The tree may be displayed by a plurality of pages. The tree edition component may represent a side frame corresponding to a tree being edited.

There may be preferably provided a node shifting component for allowing a user to shift a node of a tree to a different portion of the same tree or another tree together with document files belonging to the node.

Also, there may be preferably provided a key information checking component for allowing a user to input key information, and discriminating whether the inputted key information is contained in a list of registered information, and permitting access of the user to the document files when the inputted key information is discriminated to be contained in the list. A part of the document files may publicly opened to any user without key information checking.

The document files may be stored in a server computer which is connected with a plurality of user accessible client computers by a network. Further, there may be provided a document duplication administrating component for allowing a user to duplicate a selected document file by user's request, and a charging component for charging the duplication of a document file.

Another inventive document file administrative system comprises: a plurality of client computers each accessible by a user; a server computer containing document files each having an attribute relating to a node constituting a tree for hierarchically classifying the document files in a project; a network connecting the plurality of client computers with the server computer to thereby enable a user to search out a document file by a given attribute.

The client computer may allow a user to input key information and sends the inputted key information to the server computer, and the server computer has a list of pre-registered information and discriminates whether the inputted key information is contained in the list, and permits access of the user to the document files when the inputted key information is discriminated to be contained in the list. The server computer may have a closed database for containing data which only registered users are authorized to access to, and an opened database for containing data which any user is authorized to access. Further, the server computer may include a document duplication controller for allowing a user to duplicate a selected document file on the client computer by user's request. Moreover, the server computer may include a charging controller for charging the duplication of a document file.

An inventive method is used in a networked computer system including a server computer and a plurality of client computers accessible by users to effect a document file administration. The method comprises the steps of: preparing and storing a database containing a plurality of document files in the server computer, the plurality of document files each being attached with an attribute relating to a node constituting a tree for hierarchically classifying document files in a project; searching out a document file by a given attribute; providing a user with the presence of searched out document file in connection with the corresponding node.

There may be further provided the step of providing a user with a view of document file on the client computer for edition or duplication of the document file. Also, there may be further provided the step of providing a user with a view of a tree of a selected project for shift or duplication of a part or entirety of the tree.

An inventive program product is executable in a networked computer system including a server computer and a plurality of client computers accessible by users to effect a document file administration. The program product comprises the functions of: preparing and storing a database containing a plurality of document files in the server computer, the plurality of document files each being attached with an attribute relating to a node constituting a tree for hierarchically classifying document files in a project; searching out a document file by a given attribute; providing a user with the presence of searched out document file in connection with the corresponding node.

In these arrangements, each user is enabled to create and edit a tree representing a project on the display of his terminal computer. The user is enabled to upload a document file which has been created on his terminal computer to the server computer in association with one of nodes of the tree displayed on his terminal computer. Another user is enabled to implement data retrieval from the database of the server computer to his terminal computer. The another user is notified of the presence of a document file which he/she needs via the node of the tree displayed on his terminal computer. Other users can download a selective document file by designating the node.

The document file is a data file stored in the database of the server computer. The database is structured as a relational database which enables the user to retrieve a full text corresponding to a structured query language (SQL). Designation of a document file via the node is performed by, for example, changing the color of the node, flickering the node, or by combing these two methods.

The term "project" throughout the description corresponds to a group of document files which are interrelated to one another, and is to be stored and retrieved in and out from the database of the server computer. Each document file is given with a specified node of the tree representing the project. Since each projects can be created independently in the form of a tree, creation and edition of the tree by the user can be remarkably simplified.

In document file which have been created in association with a node and are in the form of text data, the full text search can be performed.

Table files having table computation function, mail files to be sent to each user, message data of external file and CAD data can be searched over as having text data. These data files are stored in the database of the server computer, and efficiently re-usable. The message data of external data refers to an address of an auxiliary file in which the external data is stored. The message data of CAD data is text data used in the CAD data which is stored in the auxiliary file of the server computer according to Drawing Interchange File (DXF) format. The address of the CAD data stored in the auxiliary file is attached to the message data of the CAD data.

A tree is displayed by a plurality of pages. This enables the user to view the contents of the tree with ease by merely changing the number of a page to be displayed without scrolling the display screen even in the case where the tree represents a large-scaled project.

The provision of a side frame enables the user to utilize the side frame as a temporarily hiding region for the node(s). Specifically, part or all of the nodes of the tree which the user thinks unnecessary to leave in the tree during a process of working can be temporarily shifted or hidden to the side frame. When the user thinks it necessary to return the hidden node(s) back to the tree, the node(s) can be recovered to the tree. This arrangement is advantageous in temporarily hiding the node and the document file belonging thereto without erasing the node and the document file. The side frame is provided page per page in the case where the tree is created over a plurality of pages.

The node shifting component enables the user to shift a selective node and document files belonging to the node together with the node, thereby facilitating or simplifying movement of document files. The duplication administrating component enables the user to duplicate a document file belonging to a selective node of a tree representing a project and attach the duplicated document file to the other project by duplicating the node in another tree representing another project. In the case where the node to be shifted or duplicated is connected to the other lower node(s), the lower node(s) and the document file(s) belonging thereto are also shifted and duplicated.

The document file administrative system enables a user to be authorized to access to a specific database in the server computer according to the key information check. Accordingly, even if the system is an open system which is so structured as to be commonly usable by unidentified multitude of users, there is no worry about information leakage among the users. The key information includes the ID number of a user, the password of a user, the name of a database to which a group of users are authorized to be accessible, the communication protocol of the database, and the authority level allowed to each user. The security level of the database can be enhanced by rewriting the communication protocol of the database at a predetermined time interval according to, for instance, a stored procedure. It may be preferable to structure the databases each of which is commonly usable among a group of users independently from each other in such a manner that each database is executed as a hardware. It may be preferable to provide each one of the databases with the key information referral function and the database access function which enables the user to access to a predetermined database based on the result of referral operation.

The system is further provided with an opened database for a public project. Each user can utilize document files which has been created by other user who belongs to other group in charge of other project. The public project is a project which is disclosed to all the users using the document file administrative system and commonly usable among them. The database for storing public projects and the document file belonging to the public project is the opened public database to which all the users are accessible. The public database is structured independently of databases which are allocated to the users group by group.

It will be seen that addition of a newly created document file to the database is not likely to cause problems for the public, but edition or change of the contents of an already stored document file is liable to cause serious problem for the public. Accordingly, there is provided the document file updating function which enables the user to retrieve a document file which has already existed in the database, change the retrieved document file, and store the changed document file in the database again as well as storing a newly created document file in association with a node of the tree representing the public project. The document file updating function is allowed exclusively for a user who has registered the document file as an original file for the public project, or a system administrator having a predetermined system operation authority level.

Also, there is provided the public project tree duplicating function which enables a user to efficiently utilize the tree representing the public project and a document file belonging to the tree. A mail notifying that the node or the document file has been duplicated by the other user is automatically sent to the user who has registered the specific node of the public project or the document file belonging to the specific node.

The system is operative to authorize another user to access to the database in the server computer and charge the another user for duplication of a document file belonging to a node of the tree representing the public project. There is further provided the charging function to incite a first person who has created a document file to register the document file as part of the public project, thus promoting utilization of the document file among the users.

In the document file administration, there are provided the tree creation function which enables a user to create and edit a tree on the screen of his computer, a file storage function which enables the user to store a document file in association with each one of the nodes of the tree, and a file retrieval function which enables the user to designate the presence of the document file via the node. All what the user is required to do is attaching the document file to the tree that has been created and edited in the course of a progress of his task. Accordingly, there is no need of creating, registering, and administering a key specially designed for the document file, and training of the users is facilitated.

Further, there is no need of specifying the structure of the database and setting a retrieval key in advance. Accordingly, the system is expandable because the system is applicable to any form of business. In addition, the procedure of business is reflected to the schematic construction of the tree. The information retrieval performance is enhanced, and the information can be efficiently shared and utilized because the construction of the tree tells whether the tree represents his project.

This application is based on patent application Nos. 2000-090549 and 2000-344526 filed in Japan, the contents of which are hereby incorporated by references.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A computer-based CAD file administrative system comprising:
    a display for displaying an administrative representation;
    a tree edit component for allowing a user to create and edit a tree representing a project on the display, the tree having one or more nodes;
    a CAD file edit component for allowing the user to associate the CAD file with a node of the tree by an attribute relating to the node on the display, and to store the associated CAD file in a memory;
    a text file edit component for allowing the user to create and edit a text file on the display, for extracting text data from the CAD file into the text file and to associate the text file with one of the nodes of the tree by an attribute relating to the node and to store the CAD file in the memory;
    a node shifting component for allowing the user to shift on the display one of the nodes of the tree to a different portion of the same tree or another tree, together with document files belonging to the node; and
    a search component for searching out a CAD file from the CAD files stored in the memory based on a given attribute relating to the text file, and representing the presence of the searched CAD file in connection with the corresponding node on the display.

2. A computer-based CAD file administrative system according to claim 1, wherein the CAD files include a form of text data.

3. A computer-based CAD file administrative system according to claim 2, wherein the search component searches out a file based on text data of the statement file, table file, mail file, external file, and CAD file in addition to the attribute.

4. A computer-based CAD file administrative system according to claim 1, wherein the tree is displayed by a plurality of pages.

5. A computer-based CAD file administrative system according to claim 1, wherein the tree edit component represents a side frame corresponding to a tree being edited.

6. A computer-based CAD file administrative system according to claim 1, further comprising a key information checking component for allowing a user to input key information, and discriminating whether the inputted key information is contained in a list of registered information, and permitting access of the user to the CAD files when the inputted key information is discriminated to be contained in the list.

7. A computer-based CAD file administrative system according to claim 6, wherein a part of the document files are publicly opened to any user without key information checking.

8. A computer-based CAD file administrative system according to claim 1, wherein the CAD files are stored in a server computer which is connected with a plurality of user accessible client computers by a network.

9. A computer-based CAD file administrative system according to claim 8, further comprising a file duplication administrating component for allowing a user to duplicate a selected file by request of the user.

10. A computer-based CAD file administrative system according to claim 9, further comprising a charging component for charging the duplication of a file.

11. A CAD file administrative system comprising:
    a server computer containing CAD files and text data files extracted from the corresponding CAD files each having an attribute relating to a node constituting a tree for hierarchically classifying the CAD files in a project;
    a plurality of client computers each accessible by a user and having a display for displaying an administrative representation for allowing the user to shift on the display a node of the tree to a different portion of the same tree or another tree together with document files belonging to the node; and
    a network connecting the plurality of client computers with the server computer to thereby enable the user to search out one of the CAD files by a given attribute.

12. A CAD file administrative system according to claim 11, wherein the CAD files include a form of text data.

13. A CAD file administrative system according to claim 11, wherein the client computer allows the user to input key information and sends the inputted key information to the server computer, and the server computer has a list of pre-registered information and discriminates whether the inputted key information is contained in the list, and permits access of the user to the CAD files when the inputted key information is discriminated to be contained in the list.

14. A CAD file administrative system according to claim 13, wherein the server computer has a closed database for containing data which only registered users are authorized to access to, and an opened database for containing data which any user is authorized to access.

15. A CAD file administrative system according to claim 14, wherein the server computer includes a file duplication controller for allowing the user to duplicate a selected document file on the client computer by request of the user.

16. A CAD file administrative system according to claim 15, wherein the server computer further includes a charging controller for charging the duplication of a document file.

17. In a networked computer system including a server computer and a plurality of client computers accessible by users and having a display for displaying an administrative representation to effect a method of CAD file administration, said method comprising the steps of:

preparing and storing a database containing a plurality of text data extracted from CAD files into the server computer, the plurality of text data each being attached with an attribute relating to a node constituting a tree for hierarchically classifying CAD files in a project;

preparing and storing another database containing a plurality of CAD files in the server computer, the plurality of CAD files each corresponding to the text data extracted from the CAD files and being attached with an attribute relating to the node constituting the tree in the project;

searching out a CAD file by a given attribute;

providing a user with the presence of a searched out CAD file in connection with the corresponding node; and allowing the user to shift on the display one of the nodes of the tree to a different portion of the same tree or another tree, together with document files belonging to the node.

18. A method according to claim 17, further comprising the step of providing the user with a view of the CAD file on the client computer for edit or duplication of the CAD file.

19. A method according to claim 17, further comprising the step of providing the user with a view of the tree of a selected project for shift or duplication of a part or entirety of the tree.

20. A program product which is executable in a networked computer system including a server computer and a plurality of client computers accessible by users and having a display for displaying an administrative representation to effect a CAD file administration, comprising the functions of:

preparing and storing a database containing a plurality of text data extracted from CAD files into the server computer, the plurality of text data each being attached with an attribute relating to a node constituting a tree for hierarchically classifying CAD files in a project;

preparing and storing another database containing a plurality of CAD files in the server computer, the plurality of CAD files each corresponding to the text data extracted from the CAD files being attached with an attribute relating to a node constituting the tree in the project;

searching out a CAD file by a given attribute;

providing a user with the presence of a searched CAD file in connection with the corresponding node; and allowing the user to shift on the display one of the nodes of the tree to a different portion of the same tree or another tree, together with document files belonging to the node.

21. A program product according to claim 20, further comprising the function of providing a user with a view of the CAD file on the client computer for edit or duplication of the CAD file.

22. A program product according to claim 20, further comprising the function of providing the user with a view of the tree of a selected project for shift or duplication of a part or entirety of the tree.

* * * * *